US011449477B2

(12) United States Patent
Piecko et al.

(10) Patent No.: US 11,449,477 B2
(45) Date of Patent: Sep. 20, 2022

(54) SYSTEMS AND METHODS FOR CONTEXT-INDEPENDENT DATABASE SEARCH PATHS

(71) Applicant: DataWalk Spólka Akcyjna, Wroclaw (PL)

(72) Inventors: Krystian Piecko, Herndon, VA (US); Bartosz Kolasa, Wroclaw (PL); Robert Plucinski, Wroclaw (PL)

(73) Assignee: DataWalk Spólka Akcyjna, Wroclaw (PL)

( * ) Notice: Subject to any disclaimer, the term of this patent is extended or adjusted under 35 U.S.C. 154(b) by 108 days.

(21) Appl. No.: 16/908,957

(22) Filed: Jun. 23, 2020

(65) Prior Publication Data

US 2020/0320045 A1 Oct. 8, 2020

Related U.S. Application Data

(63) Continuation of application No. PCT/EP2018/097058, filed on Dec. 28, 2018.

(Continued)

(51) Int. Cl.
*G06F 16/21* (2019.01)
*G06F 16/2452* (2019.01)
(Continued)

(52) U.S. Cl.
CPC ........ *G06F 16/212* (2019.01); *G06F 16/2423* (2019.01); *G06F 16/2452* (2019.01); *G06F 16/258* (2019.01)

(58) Field of Classification Search
CPC .. G06F 16/212; G06F 16/2452; G06F 16/258; G06F 16/2423

(Continued)

(56) References Cited

U.S. PATENT DOCUMENTS 6,400,996 B1 * 6/2002 Hoffberg ............... G06F 3/0482
700/86
7,328,209 B2 2/2008 Das et al.
(Continued)

FOREIGN PATENT DOCUMENTS

WO WO-2017186774 A1 11/2017
WO WO-2019129832 A1 7/2019

OTHER PUBLICATIONS

Almendros-Jimenez, et al., Detecting and diagnosing syntactic and semantic errors in SPARQL queries. Proceedings of the EDBT/ICDT 2017 Joint Conference, Mar. 21, 2017; Available at http://ceur-ws.org/Vol-1810/LWDM_paper01.pdf.

(Continued)

*Primary Examiner* — Dung K Chau
(74) *Attorney, Agent, or Firm* — Wilson Sonsini Goodrich & Rosati

(57) ABSTRACT

The present disclosure provides a computer-implemented method for applying an analysis to a data model comprising data objects. The method may comprise receiving the analysis and the first data model each in semantic format. Next, the analysis and the data model may be computer processed to (i) identify one or more elements missing from the data model and (ii) determine that the analysis is not applicable to the data model upon identification of the one or more elements. The one or more elements may then be presented to a user for adjusting the data model. This may be repeated until the analysis is applicable to the data model. The analysis may then be performed on the data objects of the data model.

12 Claims, 15 Drawing Sheets

Related U.S. Application Data

(60) Provisional application No. 62/612,109, filed on Dec. 29, 2017.

(51) Int. Cl.
  *G06F 16/25* (2019.01)
  *G06F 16/242* (2019.01)

(58) Field of Classification Search
  USPC ........................................................ 707/810
  See application file for complete search history.

(56) References Cited

U.S. PATENT DOCUMENTS

| | | | |
|---|---|---|---|
| 8,719,252 | B2 | 5/2014 | Miranker et al. |
| 9,396,283 | B2 | 7/2016 | Miranker et al. |
| 9,582,495 | B2 | 2/2017 | Song et al. |
| 9,747,312 | B2 | 8/2017 | Piecko |
| 10,002,143 | B2 | 6/2018 | Piecko |
| 10,095,743 | B2 | 10/2018 | Piecko |
| 10,242,056 | B2 | 3/2019 | Piecko |
| 11,093,837 | B2 * | 8/2021 | Oliner .................... G06N 20/00 |
| 2006/0092861 | A1 * | 5/2006 | Corday ............... H04L 41/5009 370/256 |
| 2010/0185700 | A1 | 7/2010 | Bodain |
| 2014/0075004 | A1 * | 3/2014 | Van Dusen ........ G06Q 30/0201 709/223 |
| 2014/0279747 | A1 * | 9/2014 | Strassner .............. H04L 41/085 706/12 |
| 2014/0379755 | A1 | 12/2014 | Kuriakose et al. |
| 2016/0086260 | A1 * | 3/2016 | Vermeulen ............. G06Q 40/00 705/35 |
| 2016/0210602 | A1 * | 7/2016 | Siddique ............. G06Q 20/384 |
| 2017/0286525 | A1 * | 10/2017 | Li ........................ G06F 16/287 |
| 2019/0034767 | A1 * | 1/2019 | Sainani .................. G06V 10/95 |

OTHER PUBLICATIONS

Datawalk: "Datawalk—Fast Testing of Fraud Scenarios" Nov. 28, 2016; Available at https://www.youtube.com/watch?v=FGE_TCx44yY; Accessed on Feb. 7, 2019.
PCT/EP2018/097058 Search Report and Written Opinion dated Mar. 25, 2019.

* cited by examiner

```
@prefix ins:<http://insurance/>.
@prefix rdfs: <http://www.w3.org/2000/01/rdf-schema#>.

#describe individual
ins:individual ins:has ins:car
               ins:unique_id ins:id
               ins:has     ins:policy
               ins:has     ins:birthdate describe claimant
ins:claimant rdfs:subclassOf ins:individual
             ins:has         ins:claim describe driver_at_fault
ins:driver_at_fault rdfs:subclassOf ins:individual
                    ins:cause ins:accident describe policy
ins:policy  ins:has ins:type .
            ins:has ins:dateRange
            ins:unique_id ins:id
            ins:has ins:car .
            ins:has ins:individual describe car
ins:car   ins:unique_id  ins:plates
          ins:participate ins:accident
          ins:has         inc:policy describe accident
ins:accident ins:has   ins:place
             ins:has   ins:date
             ins:unique_id ins:id
             ins:participate  ins:car
             ins:cause     ins:driver_at_fault
             ins:has       ins:claim describe claim
ins:claim  ins:unique:id  ins:id
           ins:has        ins:value
           ins:has        ins:claimant
           ins:has        ins:accident
```

FIG. 7B

```
@prefix ins:<http://insurance/>.

#describe individual
ins:individual    ins:has         ins:claim
                  ins:not_unique_id  ins:id describe claim
ins:claim    ins:has    ins:individual
             ins:has    ins:accident
             ins:id
             ins:has    ins:value describe accident
ins:accident    ins:has    ins:date
                ins:has    ins:place
                ins:has    ins:claim
                ins:id
```

FIG. 8B

SYSTEMS AND METHODS FOR CONTEXT-INDEPENDENT DATABASE SEARCH PATHS

CROSS-REFERENCE

This application is a Continuation Application of International Application No. PCT/EP2018/097058, filed Dec. 28, 2018, which claims priority to U.S. Provisional Patent Application No. 62/612,109, filed Dec. 29, 2017, each of which is entirely incorporated herein by reference.

BACKGROUND

A database is a data storage concept that has evolved for decades since the 1960s to address increasing difficulties in designing, building, and maintaining complex information systems (e.g., multi-user systems with a large amount of data). Another data storage concept directly related to the database is a database management system (DBMS), which enables the effective handling of databases. Although the terms, database and DBMS, define different entities, they may be inseparable; for example, the properties of a database may be determined by a supporting DBMS of the database. A DBMS may be a complex software system, such as a general-purpose DBMS (e.g., Oracle®, Microsoft® Structured Query Language (SQL) Server®).

In particular, three major DBMS approaches that are widely used in the industry to create and manage a database are relational databases, object databases, and graph databases.

A relational database can be a collection of data items organized as a set of formally described tables from which data can be accessed easily. A relational database may be created using the relational model. The software used in a relational database may be referred to as a relational database management system (RDBMS). An RDBMS may comprise a number of tables in which, for example, each table has its own primary key.

A problem with the relational database may be the complexity that arises when the relational database is created. It is generally important that defined relationships among the tables are correct and that each set of information is linked to its pair. Although less information has to be entered in total than with other database approaches, verifying that the points are set up correctly may be a time-consuming process. Furthermore, the relationships between the tables can become complicated when a relational database comprises numerous tables.

An object database (also referred to as object-oriented database management system or OODBMS) can be a database management system comprising information represented in the form of objects, such as the objects used in object-oriented programming. Object databases may be different from relational databases. In some instances, a broader database management system may comprise both object databases and relational databases.

An object database may store complex data and relationships between data directly, for example, without mapping to relational rows and columns, which may make object databases suitable for applications in which complex data may be encountered. Objects may have a many-to-many relationship and may be accessed by the use of pointers. Pointers may be linked to objects to establish relationships. Another benefit of an OODBMS may be that an OODBMS may be programmed with small procedural differences without affecting the entire system. This may be helpful for those organizations that use data relationships that are not entirely final or where there is a need to change these relationships to satisfy a new business requirement.

Disadvantages of object databases may include, for example, lower efficiency when data is complex and/or relationships are complex, that late binding may slow down access speed, data and operations being separated, low responsiveness to changes in problem space, and inadequate design for concurrent problems.

A hybrid object-relational database may be suitable for some applications. A client application may direct queries to an object server component to obtain data from data sources. An object server component may operate with an object definition component which may fulfill the queries. An object definition component may access an object definition database to obtain and use metadata, in the form of programmatic objects, about the location and structure of the data stored in the data sources. In some cases, an object manager component may, for example, work with the object definition component to edit and create new metadata or, via the object server component, create new instances of the data sources.

Graph databases may depart from traditional storage and definitions paradigms. Many software developers may be familiar with storing data in tabular form in a relational database. Such approaches may work well for some applications, but not for others. Relational databases, for example, may exhibit difficulties in scaling. Given that more and more of today's innovative applications may involve massive data processing, such large data processing requirements may expose a need for new approaches, such as graph databases. For example, tables (e.g., tables used in relational databases) may be difficult to implement in web-based environments. Since a web may be characterized more as a collection of pages that are hyperlinked, than identically-shaped rows in a gigantic table, a graph database may more closely align with present-day web architectures. In some cases, a graph, as known from mathematics, or as informally drawn or used by most engineers, may be a much more natural representation for data that is native to the web. Given that much of the data processed by today's innovative applications may exist elsewhere or in remote locations, and given that some applications may not own a substantial percentage of their own data, such as for some social feed aggregators, graph databases may be more suited than some other database models.

Current databases, such as ORACLE®, may provide for the use of an ALTER command. The process of modifying database structures may directly require locking a database structure that will be modified. There is also a related LOCK command that effectuates a freeze of a database structure for the time of modification, such as adding, searching for, or modifying records of a given table. Some end-user database systems may make use of special scripts utilizing special triggers that may execute ALTER and/or LOCK commands automatically.

In some instances, an operation of adding a column to a database may lock a table. Further, an ALTER command may stop currently executing data processing tasks, such as transactions. This may render processing operations executing with varying number of parameters ineffective, and may potentially threaten the integrity of data gathering. Further, if data are collected very quickly, the size of a data buffer may be insufficient.

The use of the aforementioned commands in databases that are updated frequently may be problematic because such approaches may require the databases to stop certain services during each modification process. It may be beneficial to create a database system that does not require the stopping of one or more services when, for example, a new column is to be added to an existing table.

Drawbacks of known graph databases may include, for example, increased memory requirements and difficulties in presenting information to a user in a clear way. In some cases, where a few nodes have a large number of connections and most other nodes have fewer connections, graph databases may be designed to keep the nodes and their linked objects (references) as close as possible (e.g., in proximity); as a result, the graph databases may not be split, leading to inefficient data drilling. Further drawbacks of current database systems include the unavailability of extending databases in real time and difficulties in understanding how a complex database is designed.

Nowadays, large volumes of data from different business domains in heterogeneous structures or metrics tend to exhibit bewildering complexity. It may be difficult to apply knowledge acquired in one domain to another domain. For instance, analysis performed in one domain may not be applicable to another domain due to the heterogeneous data structures, data models, or contexts.

At least for the disadvantages and fallbacks of the present techniques that have been described above, there is a need to design and implement an efficient database model that is especially adapted to large scale databases, is easily scalable, and is well adapted for complex and heterogeneous structures or metrics.

SUMMARY

Recognized herein are various limitations to databases and data retrieval methods that are currently available, such as those described above. It may be advantageous to improve data analysis and decision making processes with a flexible data analysis and data visualization tool. In particular, it may be advantageous to provide a tool utilizing semantic technologies (e.g., semantic tagging) and/or domain ontology for enhancing decision making, insight discovery, and process optimization.

The present disclosure provides methods and systems that may enable a user to translate a search path used for a particular data model into a semantic format, such that the semantic form search path can be applied to different data models. The semantic form search path may be stored for future use. The semantic form search path may be universally applicable, or translatable to be applicable, to different domains comprising different data models. Beneficially, a user may be able to reuse a previously built search path for exploring different data models without having to repeat the time and effort to re-build the search path for each different data model.

Methods and systems of the present disclosure may allow a user to explore, mine, and/or analyze data objects by building search paths or creating analyses. An analysis may correspond to a search path. An analysis may comprise multiple queries or operations. In particular, methods and systems of the present disclosure may permit applying analyses or search paths to data objects in different domains regardless of the contexts. This is advantageous to enhance decision making, insight discovery, and process optimization utilizing semantic technologies and/or domain ontology. The provided methods and systems may provide a unified data view to various business applications over a set of heterogeneous data sources, data contents, and data structures. Methods and systems of the present disclosure may allow data and search paths to be shared and reused across boundaries. In some cases, systems of the present disclosure may utilize semantic technology and domain ontology to improve knowledge sharing across various domains, thus improving data retrieval, decision making, and insight discovery processes.

Semantic Web technology can create a structurally uniform representation of heterogeneous data, data models, and application domain models in a stack of computer languages, RDF (Resource Description Framework), RDFS (RDF Schema), OWL (Web Ontology Language) and SPARQL (SPARQL Protocol and RDF Query Language), also known as the Semantic Web stack.

The Semantic Web, as a computing process, architecture, and form of organizing data, has been described and implemented in various ways by the W3C (World Wide Web Consortium), which is the industry group that maintains Internet protocol and data formatting standards. RDF is a graph representation of data. SPARQL is an SQL-like language for querying RDF data sources. RDFS and OWL provide rich mechanisms to encode structure and domain models and logic.

Semantic technology may refer to a suite of models, languages, and associated runtime components that include RDF as a basic data model and data representation format knowledge representation languages like OWL or simple knowledge organization system (SKOS), Inference engines, and SPARQL query engines.

The systems and methods described herein may provide a tool that may be independent of a hierarchy of a database. For example, up to now, such data analysis processes and/or data query processes may have been hardcoded in end-user software, such as Business Intelligence (BI) database software, Enterprise Resource Planning (ERP) database software, and Customer Relationship Management (CRM) database software.

In a traditional SQL-based system, a user seeking an answer may proceed through a series of queries. At each step, the query may become longer and more complex, and take longer to execute. With each incremental step, the assumptions in the query may become increasingly hidden (e.g., concealed) from the end user. Each step may require a SQL expert with knowledge of the underlying data representation. The focus with such systems may be concentrated on writing good queries. NoSQL databases or other well-known database languages may also share such problems with SQL-based systems.

A user may not need to be aware of the SQL queries (or NoSQL queries) which are being generated behind the scenes. For example, a user may not need to be aware of the SQL queries when combining multiples analyses. The systems may provide a user interface to a user, and the user interface may direct the user along a path of inquiry. Each step can be incremental and fast. As a user creates a path, all of the previous steps may be visible to the user, and the assumptions may not be buried in, for example, an exceedingly long SQL query. If a path leads to a dead-end, a user may quickly and easily return to a previous step in the path and resume exploration from that point.

Systems of the present disclosure may be connection-oriented. An underlying relational database management system (RDBMS) may be optimized around connections (as opposed to objects). For example, when the RDBMS partitions data for performance, there is no need for an object to reside wholly within a single partition. In the disclosed system, the connections may be spread across all available compute resources. Consequently, even massively linked objects may be handled without the performance penalty issues in a traditional graph database.

In an aspect, a computer-implemented method for applying an analysis to a data model is provided. The method comprises: (a) receiving the analysis and the data model, wherein the analysis and the data model are each in semantic format; (b) processing the analysis and the data model to (i) identify one or more elements missing from the data model and (ii) determine that the analysis is not applicable to the data model upon identification of the one or more elements; (c presenting the one or more elements to a user for adjusting the data model; (d repeating (b) and (c) until the analysis is applicable to the data model; and (e) performing the analysis on one or more data objects of the data model.

In some embodiments, the one or more elements comprise data objects, and the data objects are stored in defined fixed data structures. In some embodiments, the analysis comprises one or more operations executable on a second data model that is different from the data model. In some embodiments, the analysis in semantic format is generated using domain ontology and semantic technology.

In some embodiments, the data model in semantic format is generated using domain ontology and semantic technology. For example, the first data model in semantic format is generated by tagging elements of the first data model using terms from the domain ontology. In some cases, the elements comprise links, attributes, and nodes of the first data model. In some cases, the terms are automatically imported and provided to a user for tagging the elements of the data model.

In some embodiments, the elements comprise entity class, relation between entity classes, or attributes of entity class. In some cases, the one or more elements are extracted from one or more triples of the analysis in the semantic format. In some embodiments, performing the analysis on the data objects of the data model comprises: (i) transforming the analysis in semantic format into a search path executable on the data objects of the data model and (ii) executing the search path on the data objects of the data model. In some cases, transforming the analysis in semantic format into the search path comprises identifying one or more operations or steps in the search path and an order thereof.

Another aspect of the present disclosure provides a non-transitory computer-readable medium comprising machine-executable code that, upon execution by one or more computer processors, implements any of the methods described above or elsewhere herein.

Another aspect of the present disclosure provides a computer system for applying an analysis to a data model. The system comprises: a first module configured to generate a semantic representation of the data model using domain ontology and semantic technology; a second module configured to generate a semantic format of the analysis using domain ontology and semantic technology; a third module configured to (i) determine whether the analysis is applicable to the data model by processing the semantic representation of the data model and the semantic format of the analysis, and (ii) upon determining the analysis is applicable to the data model, transform the semantic format of the analysis into a search path and execute the search path on one or more data objects of the data model.

In some embodiments, the one or more data objects are stored in defined fixed data structures. In some embodiments, the first module is configured to generate the semantic representation of the data model by providing a user interface for tagging elements of the data model using terms from the domain ontology. In some cases, the elements of the data model comprise links, attributes, and nodes of the data model. In some cases, the elements of the data model comprise entity class, a relation between entity classes, or attributes of entity class. In some cases, the first module is configured to automatically import the terms and provide the terms to a user for tagging the elements of the data model.

In some embodiments, the third module is configured to extract one or more elements from one or more triples of the semantic format of the analysis and determine whether an element is missing from the data model. In some embodiments, the third module is configured to transform the semantic format of the analysis into the search path by identifying one or more operations or steps in the search path and an order thereof.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGs." herein).

FIG. 7B shows a semantic representation of the data model of FIG. 7A.

FIG. 8B shows the semantic representation of the data model of FIG. 8A.

DETAILED DESCRIPTION

Figure 1:
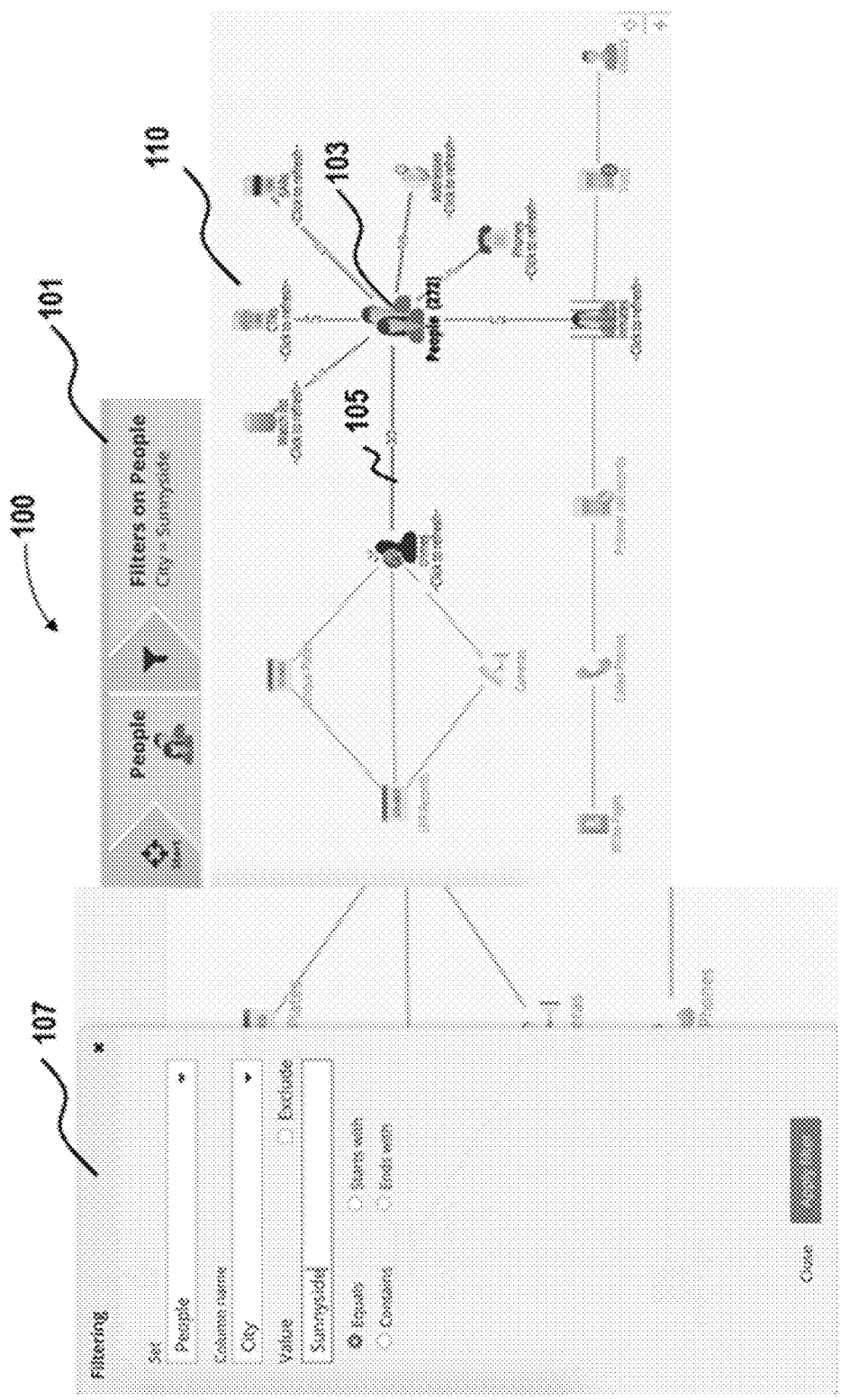
FIG. 1 shows an example of a visualized database and a search path.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Systems and methods of the present disclosure may provide a unified view of various data models. The systems and methods may be visualization-oriented, which may enable a user to explore the data objects, make decisions, or apply analyses to different data models by selecting graphical elements, such as to create data models in semantic format or create search paths.

Systems and methods of the present disclosure may allow search paths or analyses to be shared and reused across boundaries. A search path used for a particular data model may be translated and stored as a semantic format. The translated, semantic format of the search path may be applied to different data models. The semantic form search path may be universally applicable, or translatable to be applicable, to different data models. Systems of the present disclosure may utilize semantic technology and domain ontology to improve knowledge sharing across various domains, thus improving data retrieval, decision making, and insight discovery processes. The systems and methods may encode data models of various contexts using domain ontology and semantic technology, then apply search paths conformed to the domain ontology to the various data models. For instance, the visualization system may provide a user interface allowing a user to visualize an existing data model, and create a semantic representation of the data model. Creating a semantic representation of a data model may, in some instances, require tagging elements of the data model (e.g., entity class, attributes, and connections) using terms from the domain ontology. In some instances, prior to performing the analysis over a selected data model, it may be determined whether an existing search path is applicable to the selected data model. In some embodiments, the search path created in the provided system may be transformed into a semantic format and stored in a repository accessible to the system such that the semantic form search path can be shared and easily applied to data models in various contexts or domains.

Systems and methods of the present disclosure may generate a series of visible queries, enabling the system to be effectively operated by a user who has no knowledge of SQL or any specific database systems or languages. The visualization system may provide a user interface to a user, and the user interface may allow the user to explore a search path. Each step of the search path can be incremental from the previous step. Each step may generate fast results. As a user creates a search path, all or at least a portion of the previous steps of the search path may be visible to the user. The operation and/or filtering criteria associated with each step may be visible. If a path leads to a dead-end, a user may return to a previous step in the path and resume exploration from that point.

Analysis and Search Path

The present disclosure provides methods and systems for providing an analysis process by creating a search path from a first set of objects to a second set of objects. In some embodiments, search paths may be paths provided to users on a user interface, such as a graphical user interface (GUI).

An analysis may correspond to a search path. In some cases, an analysis may comprise a search path and additional information about the analysis. Such additional information may include a name and description of the analysis and/or a name and description of a component of the search path. A search path may comprise a plurality of elements such as a sequence of high level queries and/or operations on at least a subset of objects in a database. A search path may also be referred to as a "breadcrumb." The search path may be generated and/or updated automatically when a user traverses one or more data objects in the database. The search path may be generated and/or updated automatically as the user performs operations on the data objects to investigate or explore the data. In some instances, the search path may be generated and/or updated in real-time.

Real-time can include a response time of less than 1 second, tenths of a second, hundredths of a second, or a millisecond. In some instances, real-time can refer to a simultaneous or substantially simultaneous timing of one process (e.g., visualization of search path) relative to another process (e.g., user exploration of data). All of the visualize processes described herein may be capable of happening in real-time.

The search path may comprise one or more high level queries and/or operations. The one or more high level queries and/or operations may be performed by a user. In some embodiments, a high level query on the objects in the database may be translated into a set of predefined queries such as relational database management system (RDBMS) structured query language (SQL) queries. In some cases, the set of predefined queries may not be visible to a user. The set of predefined queries may be a set of optimized queries generated by the provided system upon receiving a high level query request from a user. The set of predefined queries may be optimized to improve query performance. For example, the set of predefined queries may be generated using horizontal and vertical partitioning strategies or server clustering techniques.

In some cases, a predefined query may be stored as a template query and comprise values of filtering criteria associated with the underlying objects. For instance, one template query can be used to retrieve an object and all of its properties, and another template query can be used to retrieve a list of objects that share a particular connection regardless of the underlying objects. These template queries can be used repetitively and applied to various different types of data objects.

The high level query may comprise filter operations on a set of objects, data objects, and/or connections between datasets. For example, a user may filter on a property of a selected data object, filter on the number of selected relationships between selected data sets, and/or filter on the type of connection between selected data sets.

In some embodiments, an operation can be any operation performed on objects in the database. The operation may be a filter or query operation performed on the data objects, as described above. The operation may be an analysis of a search result, such as a complementary operation of a previous filter operation that provides complementary search results of the previous filter operation. The operation may be a selection operation of a subset of sorted search results.

A search path may comprise a plurality of steps, or points. A step, or point, in a search path may be associated with an operation, as described elsewhere herein. The steps in a search path may be sequential. A subsequent step to a previous step may be cumulative, and incremental to the previous step. Visualization of the search path may comprise visualization of the sequence of the steps in the search path. A user may freely navigate from point to point in a generated search path.

One or more search paths, or operations of a search path, can be saved as a user explores connections between data sets and/or performs data analysis. The search path may represent an investigation path of a user who creates and answers questions as the user explores the data. When creating a search path, a user may select a starting data set, view the available connections from objects in the selected data set to other objects in a graphical user interface, and jump along one or more connections (i.e., perform a query on a connected data set via selecting one or more connections). Saving a series of operations or a full search path may allow a user to return to any point in the search path at a later time for further exploration. In some instances, a search path or a series of operations of a search path (i.e., partial search path) may be saved along with the respective search result that the search path reached. In some cases, the search result or intermediate search result may be saved in isolation. For example, the search path taken to reach the particular isolated search result may not be saved. This may be of benefit, for example, if the search path is particularly long or convoluted and saving the path provides little value to the user. Alternatively, the search result or intermediate search result may be saved together with the search path taken to reach the search result. In some embodiments, the system may provide an option for the user to choose whether a search result should be saved with or without the associated search path.

A search path may be created when exploring a particular data model. A data model may comprise data sets and connections in a particular domain. The provided system may be configured to translate the search path into semantic format such that the search path can be applied and reused to different data models. In some cases, only the semantic form search path is saved. Alternatively, both the semantic form search path and the corresponding executable search path may be saved.

Methods of the present disclosure may include the use of data objects. A data object stored in a data structure may be linked with another data object in the same data structure or in another data structure. However, the two data objects may be related to a single abstract class. For example, an enterprise may have multiple clients, and each client may have an identifier, a purchased product, and billing information. In a database, a client identifier and a purchased product may be placed together in a structure of a sale, but a client identifier and billing information may be organized into a structure of finance. However, an abstract class representing a client may aggregate an identifier, a purchased product, and billing information. In some embodiments, a database can be visualized as a graph with each entity class depicted as a node and connections between classes depicted as links. An interactive breadcrumb associated with an analysis or search path may be presented to a user on a user interface (UI) along with the graph. Beneficially, a visualized graph may allow a user to see a bigger picture of aggregated data objects in terms of abstract classes without going into the details of data objects.

The user interfaces may be displayed, for example, via a web browser (e.g., as a web page), a mobile application, and/or a standalone application. In some embodiments, the user interfaces shown may also be displayed on any suitable computer device, such as a cell/smart phone, tablet, wearable computing device, portable/mobile computing device, desktop, laptop, or personal computer, and are not limited to the examples as described herein. In some cases, multiple user interfaces may be switchable. A user may switch between different user interfaces than illustrated here. The user interfaces and functionality described herein may be provided by software executing on the individual's computing device, by a data analysis system located remotely that is in communication with the computing device via one or more networks, and/or some combination of software executing on the computing device and the data analysis system. The user interfaces may be provided by a cloud computing system. In some embodiments, analogous interfaces may be presented using audio or other forms of communication. In some embodiments, the interfaces may be configured to be interactive and respond to various user interactions. Such user interactions may include clicking or dragging with a mouse, manipulating a joystick, typing with a keyboard, touches and/or gestures on a touch screen, voice commands, physical gestures made in contact or within proximity of a user interface, and the like.

FIG. 1 shows an example of a visualized database 100 and a search path 101. A merit of a visualized graph is that a user may see a big picture of aggregated data objects in terms of abstract classes without having to go into the details of data objects. The visualized database may allow a user to view a data model 110 in the form of classes (e.g., graph nodes) and connections between classes (e.g, links). In the visualized database 100, each class (e.g., people) can be visualized as a graph node. In the illustrated data model 110, a class may include, but is not limited to, People 103, crimes, watch list, CTRs, SARs, Addresses, Phones, Inmates, Visits, Visitors, Prisoner Call records, Called Phones, Cameras, Unique Plates, and LPR Records. Further, such visualized classes may be linked. A link (for instance, link 105 between People 103 and crimes) may be a representation of a link of underlying data objects or entities. In some applications, a link can mean a JOIN command in a database. In some cases, a visualized link may comprise an assigned link type; in other words, a link may be further associated with a meaning beyond merely a JOIN. Multiple analyses may be performed via the visualized database 100. The multiple analyses may be generated by creating multiple breadcrumbs or search paths 101 in the graphical database (e.g., interface 107). The search path may be an interactive search path. In some embodiments, the search path (i.e., operations in a search path) and the associated search result may be stored.

In some embodiments, the search path may be presented as an interactive breadcrumb provided to a user on a graphical user interface such that a user may modify and adjust one or more parameters or filter criteria by interacting with the breadcrumb directly. A breadcrumb may be interactive ("interactive breadcrumb"). A breadcrumb may comprise a search path. A breadcrumb may comprise one or more components of a search path.

In some embodiments, the breadcrumb may comprise a plurality of visual graphical elements on the user interface. The plurality of visual graphical elements may correspond to one or more queries and/or operations performed on at least a subset of objects in the database. In some embodiments, the one or more queries can be the same as the high level queries described elsewhere herein. The high level query may comprise filter operations on a set of objects, data objects, and/or connections between data sets. For example, a user may filter on a property of a selected data object, filter on the number of selected relationships between selected data sets, or filter on the type of connection between selected data sets. The one or more operations can be the same as the operations described elsewhere herein. The one or more operations may comprise filter operations and various other operations for further analyzing a search result. For example, a complementary operation may be applied to a previous filter operation that provides complementary search results of the previous filter operation. In another example, an operation of selecting a subset of sorted search results may be performed.

In some cases, a graphical element may correspond to a query on a set of objects. Each query may comprise one or more filter operations. In some cases, a graphical element may comprise a graphical representation of options for determining a logical relationship (e.g., AND, OR, XOR, etc) of multiple filtering operations. In some cases, a graphical element may correspond to an operation for a further analysis step or presenting step of a search result. A graphical element may correspond to a step in the search path. A step in a search path may be a query operation performed on at least a subset of objects in the database, a filter operation on connections between data sets, a selection of a data set, an analysis step on a search result, and/or various other operations. A step may correspond to one operation. A step may correspond to a plurality of operations.

As mentioned above, objects in the database may be organized and stored using a set of logical data structures. Such set of logical data structures may be based on a mind map. Storing objects in a database based on the mind map architecture allows a user to explore objects, and perform analysis by creating, modifying and storing one or more search paths with improved efficiency and flexibility.

Database Systems

A relational database of the present disclosure may be summarized as follows: there are at least two sets of elements and at least one relation that define how elements from a first set are related to elements of a second set. The relation may be defined in a data structure that maps elements of the first set to elements of the second set. Such mapping may be brought about with the aid of unique identifiers (within each set) of the elements in each set. A relational database designer may find it challenging to describe real life events and entities on a very complex tables and relations diagram. Real life events, however, may be suitably defined and presented with the aid of electronic mind maps (also referred to as "mind maps" herein).

In some embodiments, an electronic mind map is a diagram which may be used to visually outline and present information. A mind map may be created around a single object but may additionally be created around multiple objects. Objects may have associated ideas, words and concepts. In some instances, the major categories radiate from each node, and lesser categories are sub-branches of larger branches. Categories can represent words, ideas, tasks, or other items related to a central key word or idea.

Figure 2:
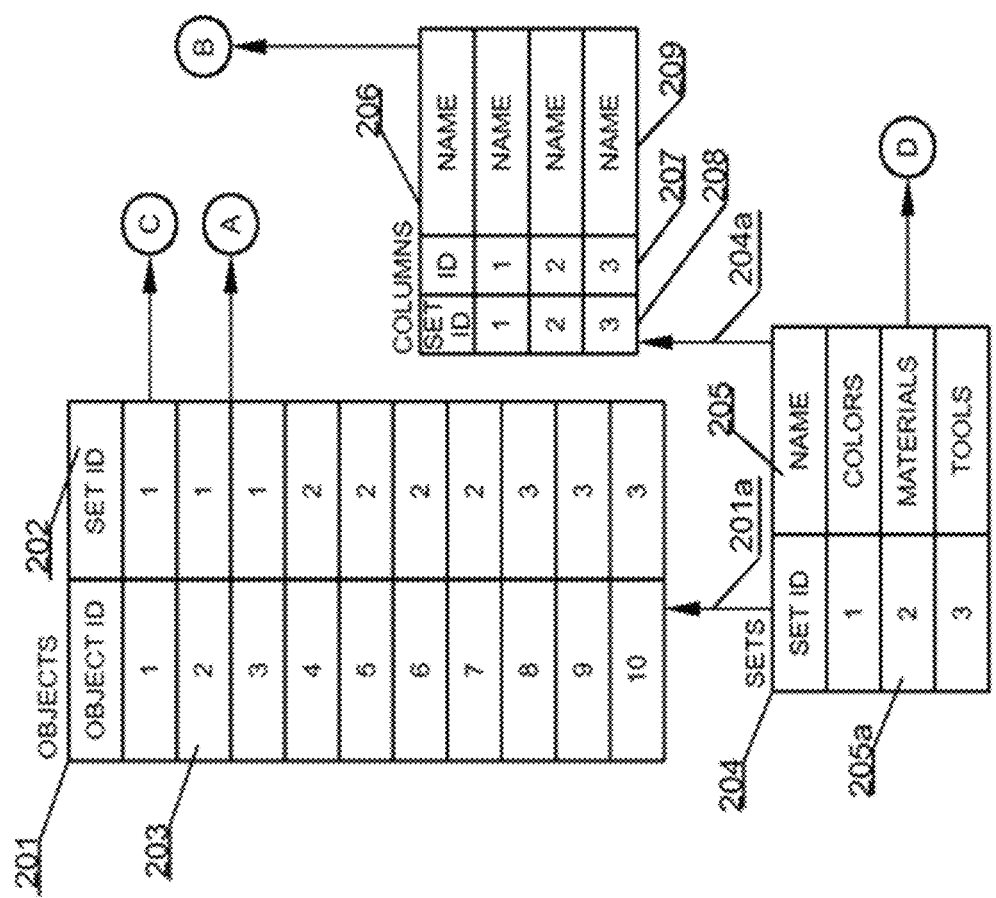
FIG. 2 shows a new database system.
Figure 3:
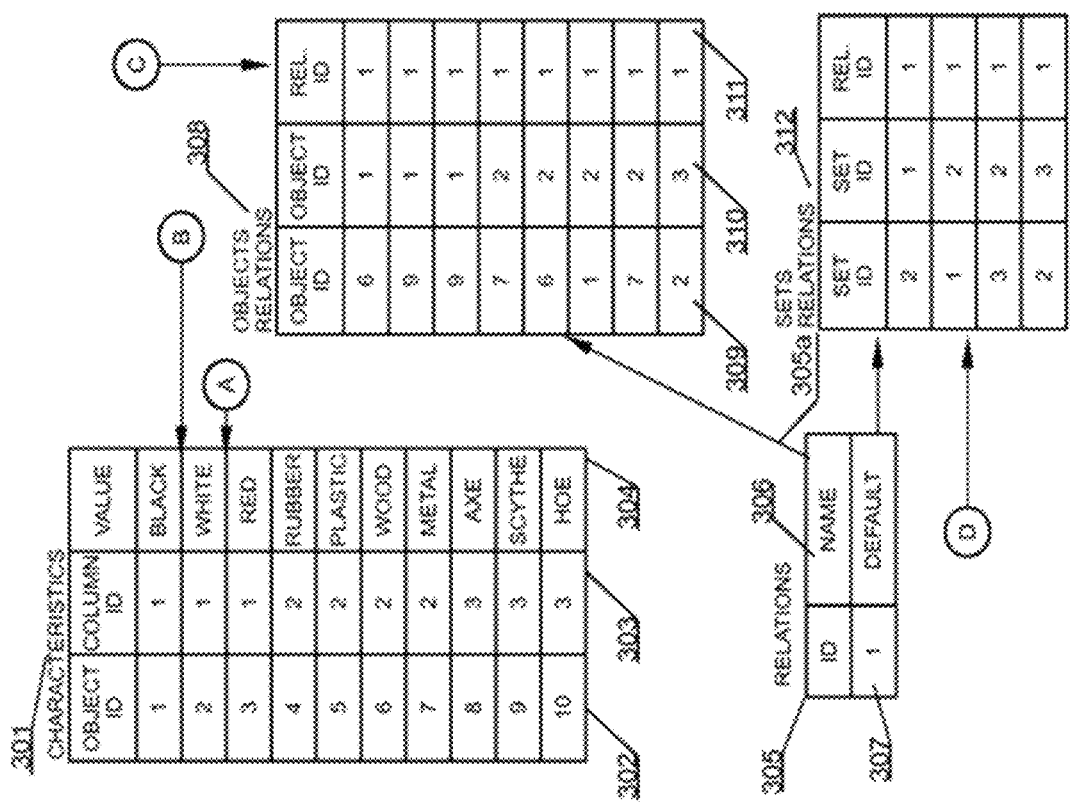
FIG. 3 shows an example of a database system of the present disclosure.

FIG. 2 and FIG. 3 show a new database system. In order to cooperate with mind maps, the database system has been designed differently than known database systems. The database system may comprise six core data structures and optional data structures. The core data structures may comprise SETS 204, OBJECTS 201, COLUMNS 206, CHARACTERISTICS 301, RELATIONS 305 and OBJECTS RELATIONS 308. The names above are examples and the respective core sets may be defined rather by their function within the system than their name.

The first data structure is called SETS 204 because it may be used to logically hold data related to sets of data. Sets of data may be represented on a mind map as nodes. Each entry in a SETS data structure 204 may comprise at least a unique identifier 205a of a data set and may also comprise a name 205 of the data set. The SETS data structure may be a top level structure and may not refer to other data structures, but other data structures may refer to the SETS data structure as identified by respective arrows between the data structures of FIG. 2.

Each set of data may be, as in the real world, characterized by one or more properties. The second data structure may be called COLUMNS 206. A property, typically referred to as a "column," may be uniquely identified with an identifier ID 207 and may be associated with a data set, defined in the SETS data structure 204, with the aid of an identifier herein called SET ID 208. A column may also be associated with a name 209. As indicated by an arrow 204a, the COLUMNS data structure may logically, directly reference the SETS data structure 204, because the COLUMNS data structure may utilize the identifiers of data sets. If, for example, each color of the data set called COLORS comprises another property, such as RGB value, in an example, an entry in the COLUMNS data structure may comprise the following values: '1, 4, RGB'. Referring back to an example from FIG. 2, there may be three columns wherein each column is associated with a textual identifier "NAME" 209.

Objects may form elements of respective data sets in the SETS 204 data structure and may have properties defined by the COLUMNS 206 data structure. Objects may be held in the OBJECTS 201 data structure. The OBJECTS 201 data structure may hold entries uniquely identified with an identifier ID 203 and associated with a set, defined in the SETS data structure 204, with the aid of an identifier herein called SET ID 202. As indicated by an arrow 201a, the OBJECTS data structure may logically, directly reference the SETS data structure, as, for example, the SETS data structure utilizes identifiers of sets. Referring back to an example from FIG. 2, there are ten objects in the database, namely three colors, four materials, and three tools. Hence, the OBJECTS data structure 201 may comprise ten objects.

A fourth core data structure, identified as CHARACTERISTICS 301 in FIG. 3, may hold data entries of each property of each object in FIG. 3. This data structure may be a fundamental difference from known databases in which there are rows of data that comprise entries for all columns of a data table. In the present disclosure, each property of an object is stored as a separate entry, which may greatly improve scalability of the system and allow, for example, the addition of object properties in real time.

The CHARACTERISTICS 301 data structure may hold entries uniquely identified using an identifier OBJECT ID 302 and may be associated with a property, defined in the COLUMNS data structure 206, with the aid of an identifier herein referred to as COLUMNID 303. Further, each entry in the CHARACTERISTICS data structure may comprise a value of a given property of the particular object. As indicated by respective arrows originating from sources A and B, the CHARACTERISTICS data structure 301 may logically, directly reference the COLUMNS data structure and the OBJECTS data structure, because CHARACTER- ISTICS data structure 301 uses the identifiers from the respective data structures. CHARACTERISTICS data structure 301 includes a VALUE property 304, such as: black, white, red, rubber, plastic, wood, metal, axe, scythe, and hoc.

Referring to an example from FIG. 3, there are ten characteristics that may result from the premise that there are three colors, four materials and three tools. By way of a non-limiting example, one can easily recognize that the BLACK color refers to an object having ID of 1 and a property having ID of 1. By using these identifiers, for example, one may determine that the property description is "NAME" and that the object belongs to the set whose description is "COLORS".

A fifth core data structure, RELATIONS 305, may function as an operator to hold data regarding relations present in the database. This may be a simple structure and, in principle, may hold an identifier of a relation ID 307 and additionally hold a textual description of the relation i.e., a NAME 306. As indicated by an arrow 305a, the RELATIONS data structure may logically, directly reference (e.g., downwards direction) an OBJECTS RELATIONS data structure 308, because the OBJECTS RELATIONS may use the identifiers of the relations. While only one entry is illustrated in the RELATIONS data structure, there may be a plurality of types of relations. For example, a type of relation may be indicative of a direction (e.g., unidirectional, bidirectional, etc.) of a relation.

Referring back to mind maps, for example, a relation present in the RELATIONS 305 data structure, may directly map to a branch between two nodes of a mind map. In some embodiments, as in typical mind maps, a relation may be provided with a textual description.

A sixth core data structure may be the OBJECTS RELATIONS data structure 308. This data structure may be designed to provide mapping between a relation from the RELATIONS data structure 305 and two objects from the OBJECTS data structure 201. For example, a first entry in the OBJECTS RELATIONS data structure 308 defines that a relation having identifier of 1 exists between object having an identifier of 1 and an object having an identifier of 6. This may be an exact definition that a material of wood has a color of black, which is defined across the present relational database system. OBJECT RELATIONS data structure 308 includes Object ID columns 309, Object ID column 310, and Relation ID column 311.

In some embodiments, a seventh data structure may exist in a database system. This data structure may hold data regarding relations between respective data sets and in FIG. 3 may be referred to as SETS RELATIONS 312. This data structure may function or operate to provide mapping between a relation from the RELATIONS data structure 305 and two sets from the SETS data structure 204. For example, a first entry in the SETS RELATIONS data structure 312 may define that the relation having identifier of 1 may exist between a set having an identifier of 1 and a set having an identifier of 2. Providing an entry in the SETS RELATION data structure 312 between a set having an identifier of 1 and a set having an identifier of 2 as well as between a set having an identifier of 2 and a set having an identifier of 1, may allow for creating a bidirectional relation.

There is also a possibility of self-referencing from a given set. For example, such case may be present when there is a set of persons and there exists a student-teacher relation between persons assigned to a particular set. Self-referencing links can be also unidirectional which means that the Entities are bound only in one direction. One can fetch information about linked Entities but cannot refer back to source from the results.

As described, a relational database system of tables may, in one possible example implementation, be stored in the above-described six data structures. In some instances, most of the data may be kept in the OBJECTS and CHARACTERISTICS data structures.

The data structures that are illustrated and described in FIG. 2 and FIG. 3 may also be altered in various ways. For example, in FIG. 2, the OBJECTS data structure can be partitioned or sharded according to SET ID 202. Sharding, as used herein, may generally refer to horizontal partitioning, whereby rows of database tables may be held separately rather than splitting by columns. Each partition may form part of a "shard," wherein each "shard" may be located on a separate database server or physical location. Similarly, in FIG. 3, for example, the CHARACTERISTICS data structure can be partitioned or sharded according to COLUMN ID 303. When sharding is used, for every column in a set, the system may create key value tables that can comprise of the values from the chosen column. The OBJECT RELATIONS table can also be partitioned or sharded according to the REL. ID 311 or sharded according to an algorithm that can maintain persistence. FIGS. 2 and 3 are for illustration purposes only and may comprise of more columns than is illustrated in those figures.

Figure 4:
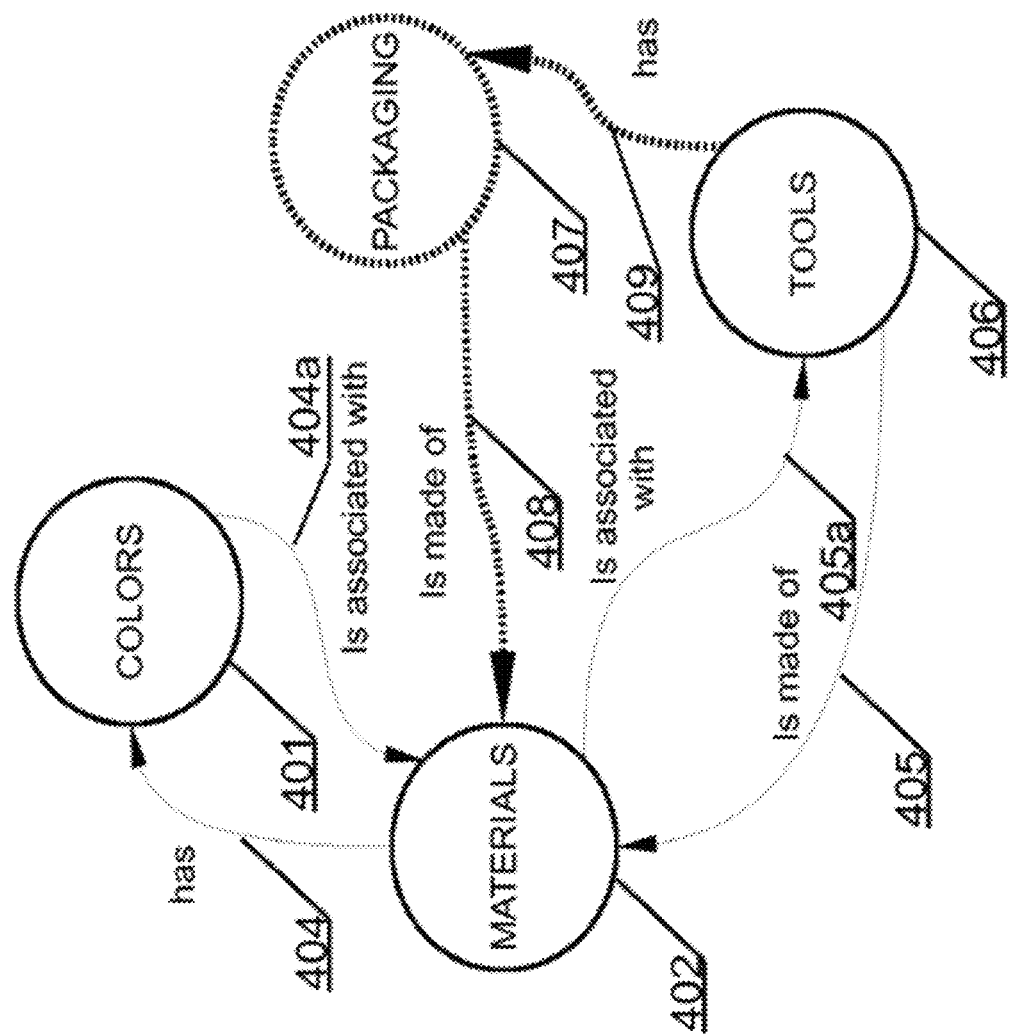
FIG. 4 depicts a mind map that may represent the database of FIG. 2 and FIG. 3.

FIG. 4 depicts a mind map that may represent relationships in the database of FIG. 2. There are three nodes that may represent sets of data, namely COLORS 401, MATERIALS 402 and TOOLS 406. A mind map may additionally define branches between respective nodes. Taking into account the relational database which may be defined according to the new database system in FIGS. 2 and 3, there are four branches. A first branch 404 of the mind map is defined between COLORS 401 and MATERIALS 402 and may imply that a MATERIAL may have a COLOR. A second branch 404a of the mind map may be defined between COLORS 401 and MATERIALS 402 and may imply that a COLOR may be associated with a MATERIAL.

Similar to the first two branches, a third branch 405 of the mind map is defined between MATERIALS 402 and TOOLS 406 and may imply that that a TOOL may be made of a MATERIAL. A fourth branch 405a of the mind map may be defined between MATERIALS 402 and TOOLS 406 and may imply that a MATERIAL may be associated with a TOOL.

The relational database may be further expanded to also encompass a possibility that a TOOL may have 409 a PACKAGING 407 and the PACKAGING is made of a MATERIAL from MATERIALS 408.

In some embodiments, because all identifiers may be generated automatically, during creation of the database system of FIGS. 2-3, one may start from the mind map presented in FIG. 4. For each node, a designer may create a name of a set and properties of the objects that may be kept in the set. Similarly, the designer may create branches as relations between respective nodes, such as data sets. Based on such mind map definitions, the system of FIGS. 2-3 may be automatically generated from the mind map of FIG. 4. In particular embodiments, there may additionally be a process of assigning properties to each node of the mind map, wherein each property is an entry in the second data structure, such as the COLUMNS 206 data structure.

A database structure disclosed herein can be created by a method described as follows. A computer implemented method may store data in a memory and comprise the following blocks, operations, or actions. A first data structure may be created and stored in a memory, wherein the first data structure may comprise a definition of at least one data set, wherein each data set comprises a data set identifier and logically may hold data objects of the same type. Next, a second data structure may be created and stored in the memory, wherein the second data structure may comprise definitions of properties of objects, wherein each property may comprise an identifier of the property and an identifier of a set to which the property is assigned.

Further, a third data structure may be created and stored in the memory, wherein the third data structure may comprise definitions of objects, and wherein each object comprises an identifier and an identifier of a set the object is assigned to. A fourth data structure may be created and stored in the memory, wherein the fourth data structure may comprise definitions of properties of each object, and wherein each property of an object associates a value with an object and a property of the set to which the object is assigned. A fifth data structure may be created and stored in the memory, wherein the fifth data structure may comprise definitions of relations, and wherein each relation comprises an identifier of the relation. Finally, a sixth data structure may be created and stored in the memory, wherein the sixth data structure may comprise definitions of relations between objects wherein each objects relation associates a relation from the fifth data structure to two objects from the third data structure.

In accordance with the database system of the present disclosure (e.g., FIGS. 2-3), a process of adding an object (a record) to the database may be outlined as follows. First a new entry may be created in the OBJECTS data structure 201. The object may be assigned to a given data set defined by the SETS data structure 204. For each object property of the given set defined in the COLUMNS data structure 206, there may be created an entry in the CHARACTERISTICS data structure 301. Subsequently there may be created relations of the new object with existing objects with the aid of the OBJECTS RELATIONS data structure 308.

A method of removing objects from the database system is described below. First, an object to be removed may be identified and its corresponding unique identifier may be fetched. Next, any existing relations of the object to be removed with other existing objects may be removed by deleting entries in the OBJECTS RELATIONS data structure 308 that are related to the object being removed. Subsequently, the object entry may be removed from the OBJECTS data structure 201. The object may be removed from a given data set defined by the SETS data structure 204. Because the properties of each object are stored separately, for each object property of the given set defined in the COLUMNS data structure 206, there is removed an entry in the CHARACTERISTICS data structure 301 related to the object identifier being removed from the database.

A method for creating the database system using a mind map is provided. The first step may be to create a mind map structure. Defining a database system using a mind map may be beneficial and allow a designer to more easily see the big picture in very complex database arrangements. A designer may further be able to visualize the organization of data sets and relations that may exist between the respective data sets. Next, a new node may be added to the mind map structure. This may typically be executed via a graphical user interface provided to a database designer. A node of a mind map may represent a set as defined with reference to FIG. 2. Therefore, it may be advantageous at this point to define, preferably using the graphical user interface, properties associated with the data set associated with this particular node of the mind map. Then, a record or entry may be stored in the first and second data structures, which are the SETS data structure 204 and COLUMNS data structure 206 of FIG. 2, respectively.

The next step may be to create a branch within the mind map. A branch may start at a node of the mind map and end at the same node of the mind map to define a self-relation. For example, there may be a set of users for which there exists a hierarchy among users. Alternatively or in addition to, a branch may start at a node of the mind map and end at a different node, for example, of the mind map to define a relation between different nodes, i.e., different sets of objects of the same kind.

The following operations may be executed to store a record in the fifth data structure, which is the RELATIONS data structure 305 of FIG. 3. At least one object can be added to existing data sets, i.e., nodes of the mind map. In some embodiments, a way of adding objects to mind map nodes may be by way of a graphical user interface with one or more graphical elements representing nodes and connections among the nodes. For example, by choosing an option to add an object, a user may be presented with a set of properties that may be set for the new object. The properties may be defined in the COLUMNS data structure 206 of FIG. 2. After the user provides an input, an object may be added to the selected node of the mind map by storing one or more records in the third, fourth, and sixth data structures that are the OBJECTS data structure 201, the CHARACTERISTICS data structure 301 and OBJECTS RELATIONS data structure 308 of FIGS. 2 and 3, respectively.

Databases of the present disclosure may store data objects in a non-hierarchical manner. In some cases, such databases may enable database queries to be performed without the need of joins, such as inner or outer joins, which may be resource intensive. This may advantageously improve database queries.

Figure 5:
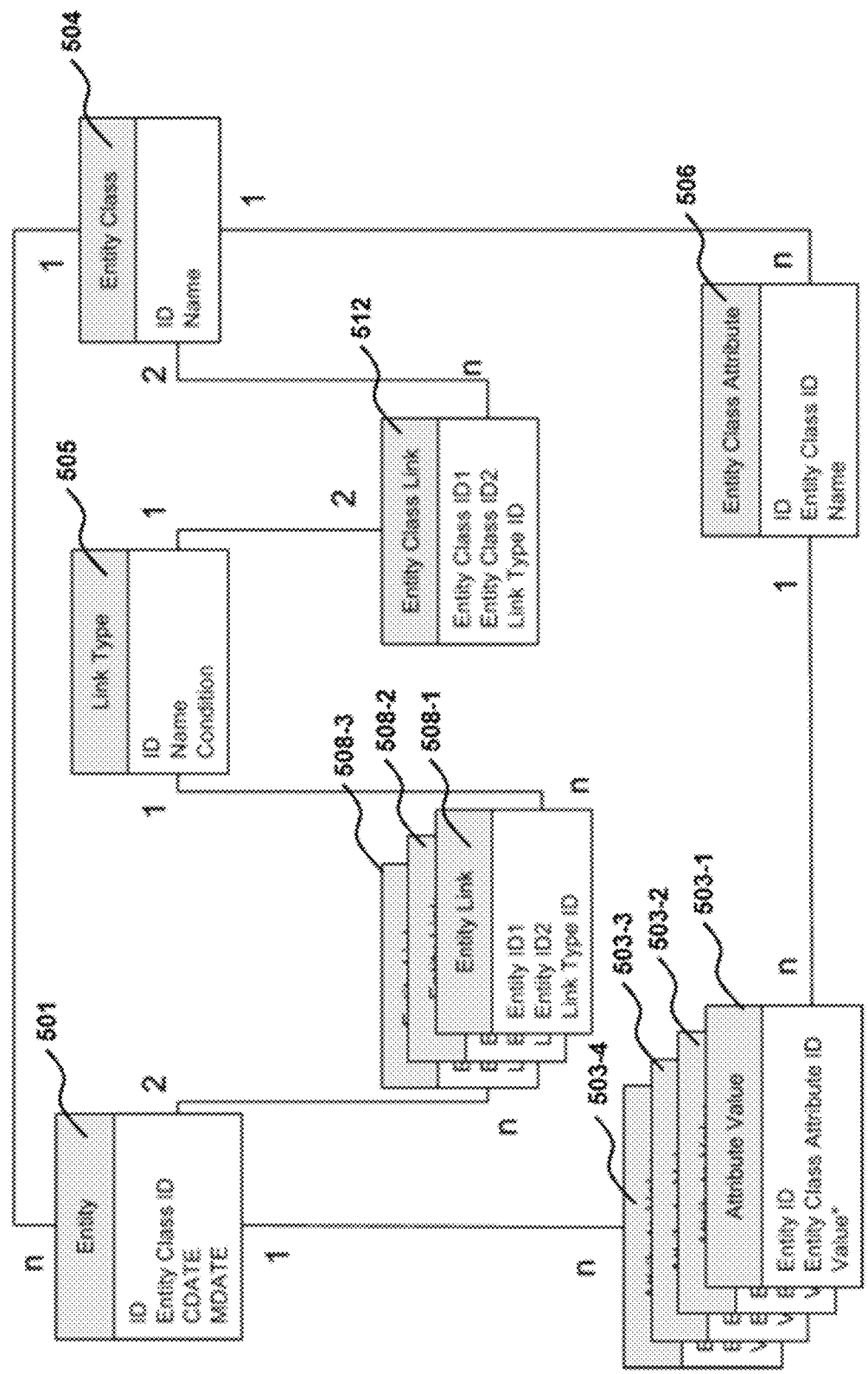
FIG. 5 shows a model of a database system of the present disclosure.

In an example, FIG. 5 shows a model of a database system of the present disclosure. The model may be similar to, or correspond to, the examples of the database systems described in FIG. 2 and FIG. 3. The model may comprise a set of predefined data structures. In the illustrated model, the Entity data structure 501 may correspond to the OBJECTS data structure 201 as described in FIG. 2. Similarly, the Entity data structure may hold entries uniquely identified with an identifier ID (e.g., ID) and associated with an entity class, defined in the Entity Class data structure 504, with the aid of an identifier herein called Entity Class ID. The Entity data structure 501, in some embodiments, may further comprise a timestamp corresponding to the date and time an object is created (e.g., CDATE) and/or date and time an object is last modified (e.g., MDATE).

The Entity Class data structure can correspond to the SETS data structure 204 as described in FIG. 2. Similarly, the Entity Class data structure may hold data related to Entity Class data. Classes of data may be represented on a mind map as nodes. Each entry in an Entity Class data structure 504 may comprise at least a unique identifier (e.g., ID) and may also comprise its name (e.g., Name). For each entity property of the given entity class defined in the Entity Class Attribute data structure 506, there may be created an entry in the Attribute Value data structure 503-1, 503-2, 503-3, 503-4. Subsequently there may be created relations of the new object with existing objects with the aid of the Entity Link data structure 508-1, 508-2, 508-3.

The Entity Class Attribute data structure 506 can correspond to the COLUMNS data structure 206 as described in FIG. 2. Similarly, the Entity class Attribute data structure 506 may hold entries uniquely identified with an identifier ID (e.g., ID) that is associated with an entity class, defined in the Entity Class data structure 504, with the aid of the Entity Class ID, and the name of the attribute (e.g., Name). The Attribute Value data structure 503-1, 503-2, 503-3, 503-4 may correspond to the CHARATERISTICS data structure 301 as described in FIG. 3, except that the Attribute Value data structure may use multiple tables 503-1, 503-2, 503-3, 503-4 to hold entries uniquely identified using an identifier (e.g., Entity ID), a property defined in the Entity class Attribute data structure 506, with the aid of an identifier (Entity Class Attribute ID) and a value of a given property of the particular entity (e.g., Value). In some cases, the multiple tables may collectively hold the attribute values with each table storing a portion of the data.

The Entity Link data structure 508-1, 508-2, 508-3 can correspond to the OBJECTS RELATIONS data structure 308 as described in FIG. 3 with the exception that multiple tables 508-1, 508-2, 508-3 may be used to collectively hold data related to relations or connections between two entities. Similarly, an entry of the Entity Link data structure may comprise two entity IDs (e.g., Entity ID1, Entity ID2) and the identifier of the Link Type (e.g., Link Type ID) between the two entities. The Link Type identifier may reference from the Link Type data structure 505.

The Link Type data structure 505 can correspond to the RELATIONS data structure 305 as described in FIG. 3. Similarly, the Link Type data structure 505 may hold an identifier of a link type ID (e.g., ID) and additionally hold a textual description of the link (e.g., NAME). In some cases, the link type can define a permission level of accessing the connection between entities or entity classes. For example, the link type may be a private type link that only the user who creates the link or the system administer can view or modify, or a public type link that can be viewed or defined by any user. For instance, an administrator or certain users with privileges may configure a link to be visible to other users. In this case, the administrator may decide to "publish" the link, which may enable the link to be available to the public, thereby converting the link type from private to public. Alternatively or in addition to, a link type may have various other permission levels or editable privileges that are provided by the system.

Semantic Representation of a Data Model

The provided system may utilize semantic technology and domain ontology to transform a search path and data model into semantic format. Due to the unstructured and heterogeneous nature of data resources and business applications, different data models may use different terminology to describe similar things. Provided are methods and systems that allow a search path (or logic thereof) to be applied to various data models regardless of context.

Semantics can be directly incorporated into a document by using Resource Description Framework (RDF). RDF may be used as a general method of modeling information, through a variety of different syntax formats. RDF has been developed by the World Wide Web Consortium and more information is available in the Internet.

In the RDF metadata model, statements can be made about resources in the form of subject-predicate-object expressions, called "triples" in RDF terminology. The subject denotes the resource, while the predicate denotes traits or aspects of the resource and expresses a relationship between the subject and the object. For example, one way to represent the notion "The sky has a blue color" in RDF is as a triple of specially formatted strings with a subject denoting "sky", a predicate denoting "hasColor", and an object denoting "blue". Thus, RDF can be used to make semantic descriptions of web resources. However, RDF does not contain any ontological model.

Ontology is the formal, explicit specification of a shared conceptualization between entities which is used for naming and defining the types, properties, and interrelationships of the entities. Ontology can provide a shared vocabulary, which can be used to model domains. An ontological model provides a structural framework for organizing information and serves as a knowledge representation of a domain. Using certain categories, an ontological model can represent entities, ideas, and events, in addition to their properties and relationships. Domain ontologies are declarative knowledge models, defining essential characteristics and relationships for specific domains, which can be utilized as a semantic foundation for annotating and integrating distributed data sources. Ontology systems may include OWL (Web Ontology Language) which has a vocabulary for describing properties and classes, ranges, domains and cardinality restrictions on domains and co-domains, relations between classes (e.g. disjointness), equality, and enumerated classes. OWL is a family of knowledge representations for creating ontologies that are characterized by formal semantics and RDF/XML-based serializations.

Figure 6:
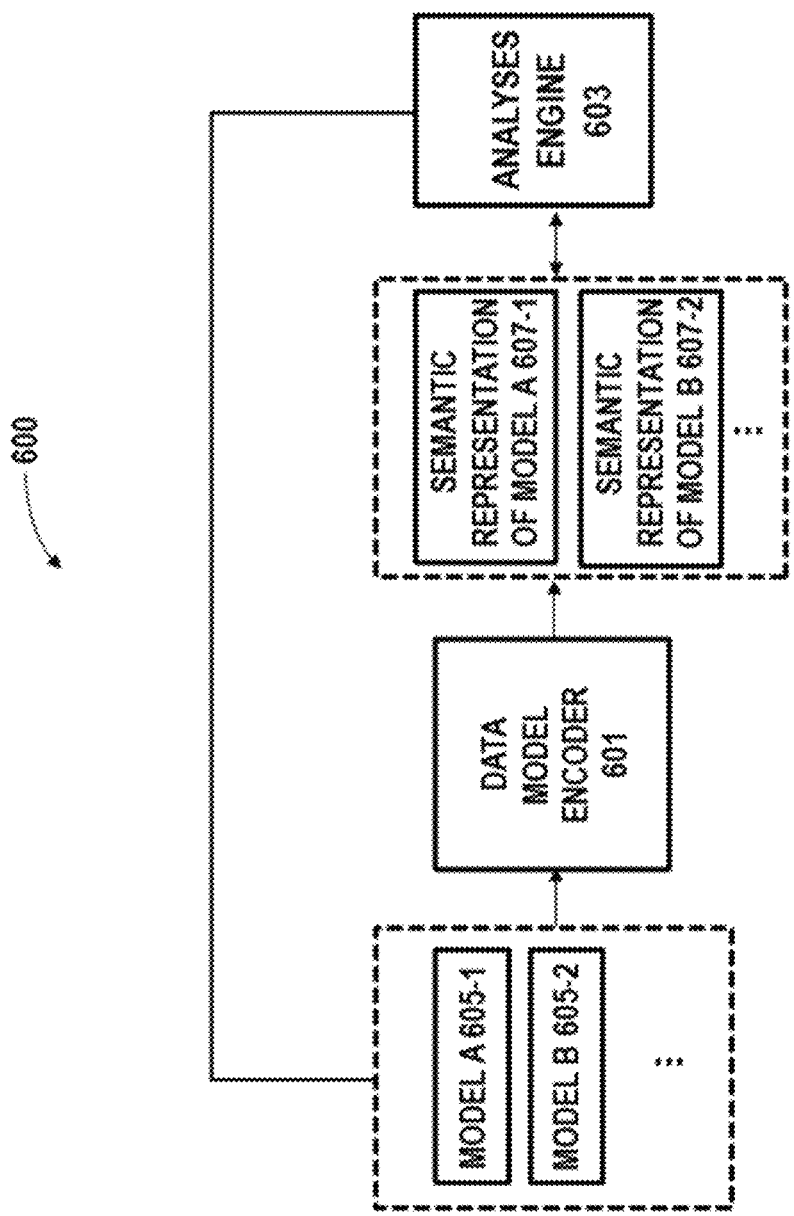
FIG. 6 schematically shows a block diagram of a system for encoding data models into semantic format, in accordance with embodiments of the invention.

FIG. 6 schematically shows a block diagram of the system 600 for encoding data models into semantic format, in accordance with embodiments of the invention. The system 600 may be a component of the visualized database system as described above. Alternatively, the system 600 may be a separate system operably coupled to the visualized database system as described above. The system 600 may comprise a first component configured to encode data models into semantic representations. Data models in semantic format may then be analyzed by a second component of the system 600 to determine whether a search path is applicable to the data model.

In some embodiments, the first component of the system 600 may comprise a data model encoder 601 configured to create a semantic representation for a data model. In some cases, the data model encoder 601 may transform the one or more data models 605-1, 605-2 to equivalent representations 607-1, 607-2 in one or more Semantic Web languages, including, but not limited to, RDF (Resource Description Framework), RDFS, OWL or RIF.

The one or more data models 605-1, 605-2 may be in the form of entity classes and connections as described in FIG. 1 (e.g., data model 110). In some cases, different data models 605-1, 605-2 may have different structures or have different metadata (e.g., name of entity class). In some cases, different data models may be different in at least one of data types, entity classes, entity class attributes, entity class relations, definitions, or values of the various data structures as described in FIGS. 2-5. In some cases, different data models may be in different domains.

The data model encoder 601 may be configured to encode the data models using domain ontology. Domain ontology may be used to describe metadata of the data model including, but not limited to, entity classes, entity class attributes, and relation between entity classes. In some embodiments, an entity class may be encoded in web ontology language (OWL). Persons of skill in the art can appreciate that ontologies may be implemented in many different formats and languages. In some cases, Uniform resource identifier (URIs) may be used to give a unique ID to the subjects, predicates, or objects of statements. For example, a data model may be represented by a collection of triples. The following is a non-limiting example of defining entity class and entity class attributes (e.g., entity class data structures described in FIG. 5) using OWL statements:

```
@prefix rdfs: <http://www.w3.org/2000/01/rdf-schema#>
@prefix ins: <http://insurance/name>
@prefix foaf: <http://xmlns.com/foaf/0.1/>
@prefix rdf: <http://www.w3.org/1999/02/22-rdf-syntax-ns#>
#definition of class
ins:individual a rdfs:DataType
ins:individual foaf:name ins:name
#name definition
ins:name a rdf:Property .
ins:name rdfs:domain ins:individual
    ins:name rdfs:subClassOf rdfs:Literal
```

The data model encoder 601 may transform data models 605-1, 605-2 into semantic representations 607-1, 607-2 using the aforementioned domain ontology. In some cases, the transformation may be performed by providing the data models 605-1, 605-2 in the visualized system such as the visualized system shown in FIG. 1, receiving terms from a user for tagging the elements of the data model, including but not limited to, graph nodes (e.g., entity class attributes, name an entity class) and links (e.g., entity class relations) presented in the visualized system, and generating semantic representations of the data models. Alternatively or additionally, the transformation may be performed automatically without user input. In other cases, the transformation may be a semi-automatic process. For instance, the annotated data or annotation (i.e., terms from domain ontology) may be imported to the database using an importer and a user may then select from the annotated data to tag an element.

Figure 7A:
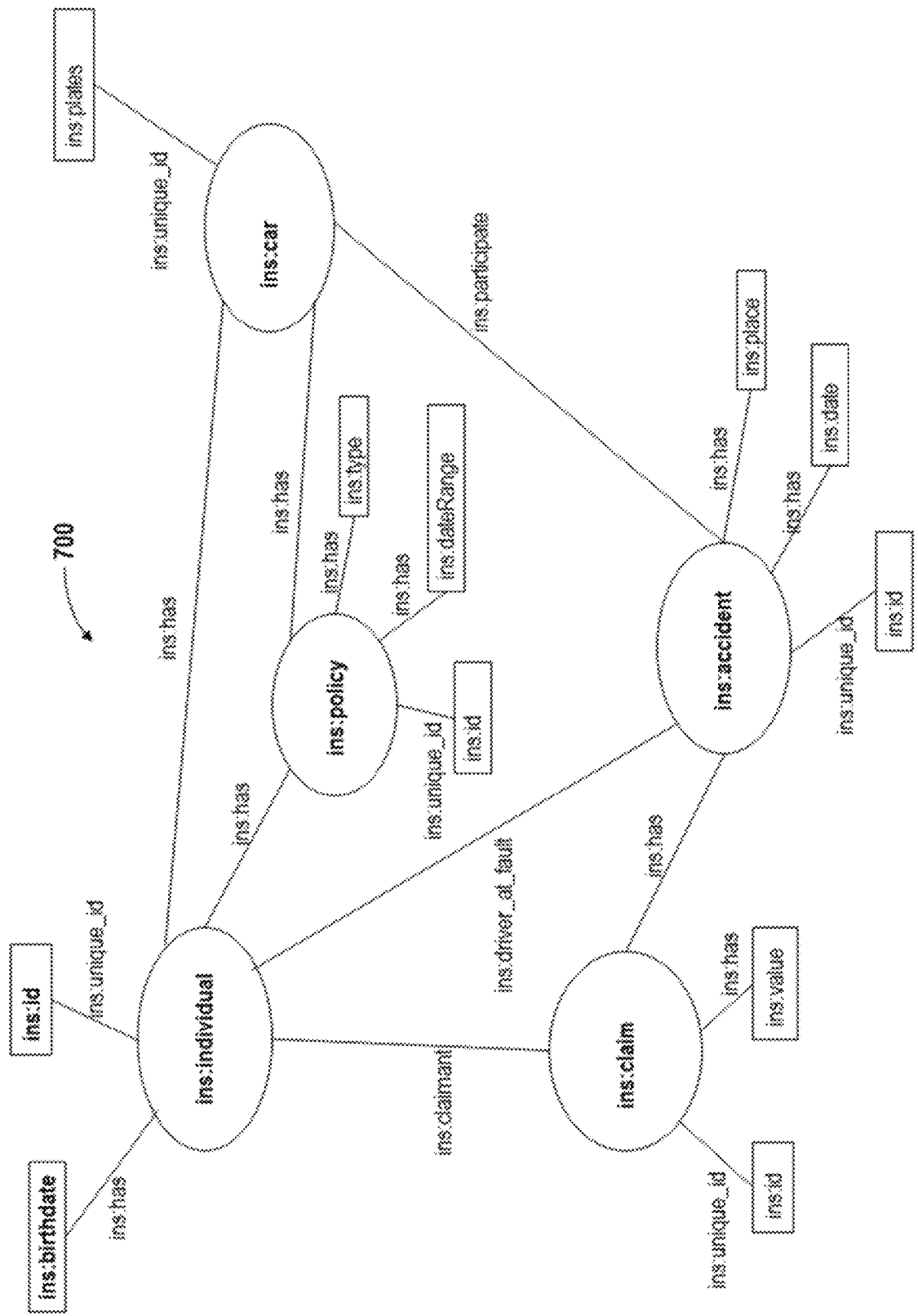
FIG. 7A shows an example of a data model.
Figure 8A:
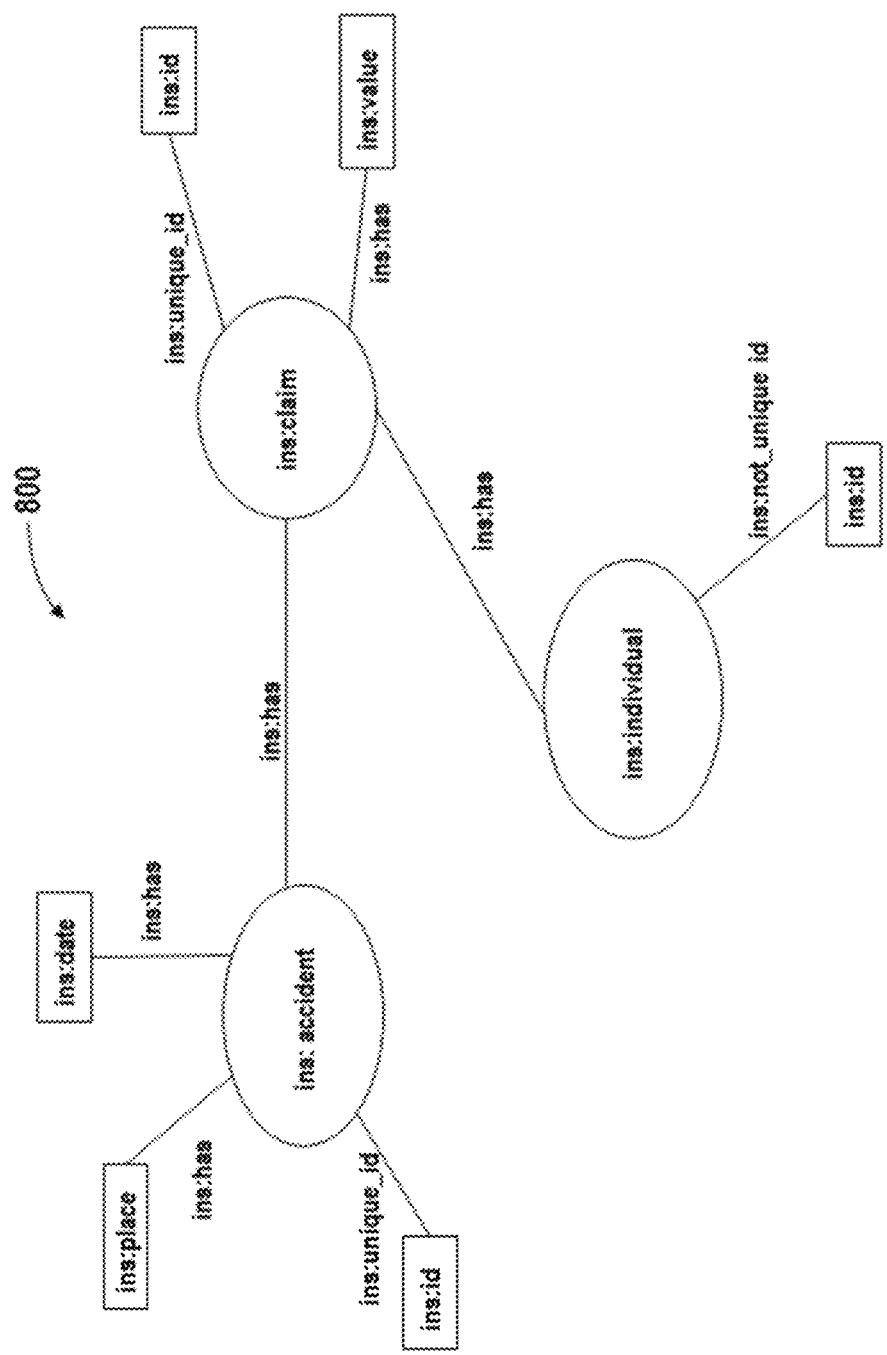
FIG. 8A shows an example of another data model.

FIG. 7A and FIG. 8A show examples of different data models 700, 800, and FIG. 7B and FIG. 8B show the semantic representations of the two data models respectively. The data models 700, 800 as shown in FIG. 7A and FIG. 8A may be different. For instance, entity classes of the two data models may be different. For example, entity classes 'car' and 'policy' in the data model 700 are missing from the data model 800. In another example, entity class attributes may be different in the two data models. For instance, 'birthdate' of the 'individual' class in data model 700 is missing from the data model 800. In another instance, objects in the 'individual' class in data model 700 may be uniquely identified by 'id' whereas objects in the 'individual' class in data model 800 may not be uniquely identified by 'id.'

As illustrated in the two data models 700, 800, elements of the data model may be tagged using terms from domain ontology. For instance, entity classes (e.g., graph nodes) and relations (e.g., link type) are tagged using terms from the associated domain ontology. In some cases, an entity class or class attribute may be tagged with predefined metadata such as attributes (e.g., entity class name). The provided domain ontologies may provide the predefined metadata or annotated data. In some cases, the elements of a data model may be tagged using standard annotation framework. In some cases, URIs may be used to give a unique ID to the subjects, predicates, and/or objects of statements. In the illustrated example, the entity class 'individual' in data model 700 is tagged with name 'ins: individual.' The relations between the 'individual' and 'birthdate' is tagged with 'ins:has.'

As mentioned above, the elements of the data model in the example may be manually tagged or automatically tagged. In some cases, the annotated data (i.e., terms from domain ontology) is imported to the database using an importer and a user may then select from the annotated data to tag an element.

The data model encoder 601 may be configured to generate a semantic representation corresponding to a data model. The semantic representations of the data models may be generated based on the tagged elements in the data model. FIG. 7B and FIG. 8B show the semantic representations of the two data models respectively. In some cases, the data models may be encoded in OWL with a set of ontology classes. In the example shown in FIG. 7B, the individual entity class is represented as RDF triples. The precise content of the RDF triples may be determined by and be consistent with the domain model. The RDF triples can be queried using language such as SPARQL (SPARQL Protocol and RDF Query Language). For example, the following is an example of SPARQL query used to retrieve information about an attribute value of attribute named 'tin':

```
select ?object WHERE
{ <http://insurance/tin> rdfs:domain ?object }
```

The system 600 may comprise a second component configured to analyze the data models in semantic format in order to determine whether a search path is applicable to the data models. The second component may comprise an analyses engine 603. The analyses engine 603 may be configured to determine whether a search path is applicable to a selected data model. In some cases, the analyses engine 603 may also be configured to translate a search path created for a first data model (e.g., model A 605-1) into a semantic format such that the search path can be applied to data models different from the first data model (e.g., model B 605-2).

Figure 9:
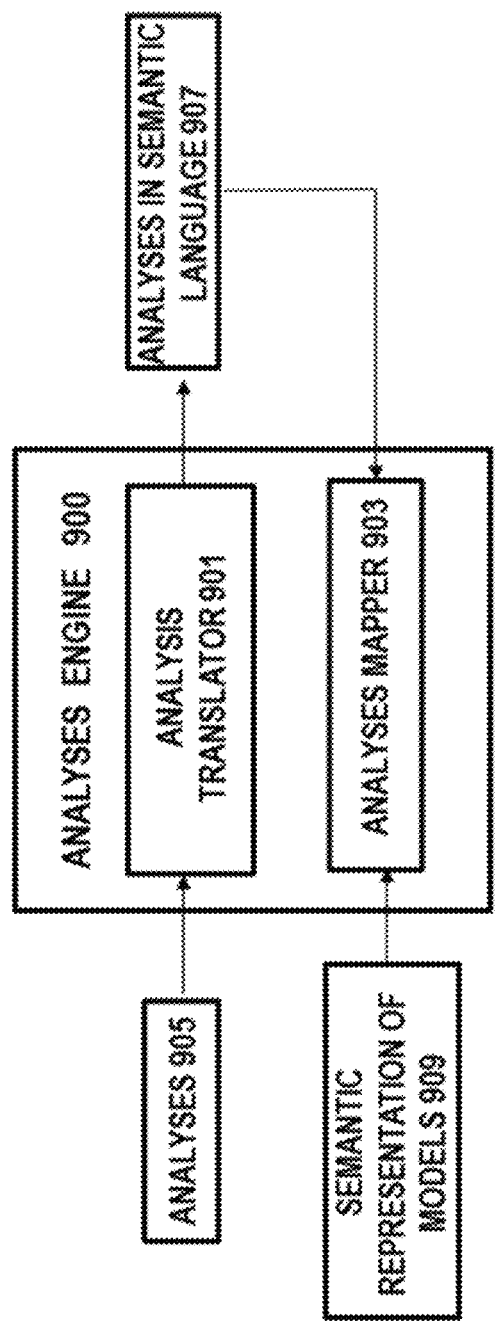
FIG. 9 schematically shows a block diagram of an analyses engine.

FIG. 9 schematically shows a block diagram of an analyses engine 900. The analyses engine 900 can correspond to, or comprise, the analyses engine as described in FIG. 6. The analyses engine 900 may comprise an analysis translator 901 configured to translate an analysis or search path 905 into semantic format 907. The analyses engine 900 may further comprise an analyses mapper 903 configured to determine whether a search path can be applied to a selected data model. The analyses mapper 903 may be capable of determining an applicability of a search path by analyzing the search path and selected data model in semantic format. It should be noted that the depicted analyses engine is an example, and the analyses engine can have variants that may include fewer or more components. For example, the analyses engine may not include the analysis translator. An analysis or search path in semantic format can be received from any source (e.g., an existing search path translated by a component of the system, an OWL form analysis imported from an external source, etc.), then analyzed by the analyses engine in order to be applied to a data model.

Figure 10:
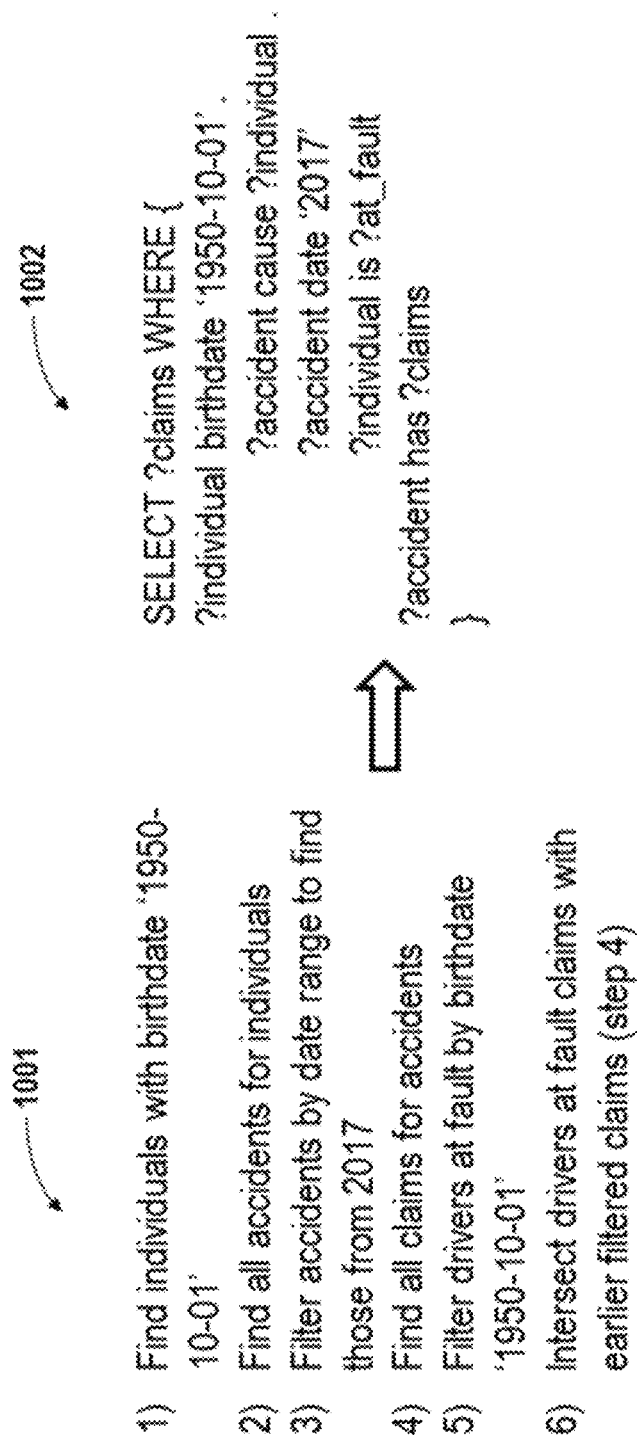
FIG. 10 shows an example of transforming a search path into semantic format.

The analysis translator 901 may be configured to translate a search path or analysis 905 in semantic langue 907. As described elsewhere herein, a search path may comprise one or more steps. The search path may be transformed into equivalent semantic format using semantic technology such as OWL and domain ontology. FIG. 10 shows an example of transforming a search path 1001 into semantic format 1002. In the illustrated example, the search path 1001 may be executed over data models in an insurance domain. The analysis may be searching for "all claims from 2017 for individual with birthdate '1950-10-01' for which individual caused an accident." The search path 1001 may comprise a series of steps (e.g., six steps). The analysis translator 901 may then translate the search path 1001 using OWL and the related domain ontology. For instance, operations and variables in the search path 1001 may be parsed and mapped to RDF triples according to the model ontology. In some embodiments, the semantic form search path may be stored in a repository accessible to the visualized system and/or the analyses engine such that the search path can be shared and reused in different data models. A repository may be a storage medium where data are stored and maintained. The repository can be a place where multiple databases, files, records or data are located for distribution. The repository can be created with or without a socket or a network connection. The repository can be a location in the memory accessible to the visualized database system or the analyses engine. For instance, the semantic form analysis may be stored as triple tables or other suitable data structures.

The analyses mapper 903 may be configured to determine if a search path can be applied to a selected data model. A search path may be determined to be applicable, or executable for, a selected data model by analyzing the search path and the selected data model, each in semantic format. In some cases, determining if a search path is applicable comprises detecting if all the conditions of the search path are satisfied.

In some cases, a search path may be determined to be not executable on the selected data model upon detection of an unsatisfiable condition. In some cases, a condition may be unsatisfied when an element is detected to be missing from the selected data model. The element may be an entity class, a relation between entity classes, an attribute or any other data defining an element in the triples of the semantic form search path. The element may be extracted from the subject, predicate, or object of the triples contained in the semantic form search path.

In some cases, one or more missing elements may be detected by the analyses mapper 903. In some cases, the elements missing from the selected data model may be identified so that the selected data model can be adjusted accordingly to satisfy the condition of the search path. Below is an example of detecting unsatisfiable conditions in a search path prior to applying the search path to a selected data model (e.g., data model B 800 in FIG. 8A). The search path may be executable over a different data model (e.g., data model A 700 in FIG. 7A).

Consider the following analyses in OWL that are executable on data model A, assuming a search date of year 2017:
1) Find all claims for individuals who are currently 30 years old and who has had an accident in 2017 and for which the claimant caused the accident

```
@prefix ins:<http://insurance/>.
SELECT ?claim WHERE {
?individual ins:birthdate '1987'
?accident ins:has ? individual
49406-709.301
?accident ins:date '2017'
?claim ins:has ? accident
?individual is ? claimant
}
2) Find all claims that happened in Washington for AC policy
@prefix ins:<http://insurance/>.
    SELECT ?claim WHERE {
        ?accident ins:place 'Washington'
        ?car ins:participate ?accident
        ?car ins:has ?policy
        ?policy ins:type 'AC'
    }
```

By extracting the elements such as entity classes (e.g., individuals, individual, accident, claim, car, policy), relations (e.g., has, type) from the triples of the analysis in semantic format, and comparing the elements to the elements in the semantic form data model B, a missing element can be detected. For instance, for analysis 1), the elements missing from data model B may include: unique_id associated with 'individual' entity class, definition of 'claimant' relation, and 'Birthdate' for 'individual.' For analysis 2), the elements missing from data model B may include: Tar' class and 'Policy' entity class.

In some cases, upon detection of a missing element, the selected data model may be adjusted or modified in order to satisfy the all the conditions of the search path. The selected data model may be modified manually by a user or adjusted automatically. In some cases, based on the detected missing elements, a user may be provided with information regarding how to further adjust the selected data model in order to meet the conditions of the search path. For example, when the 'unique_id' is detected to be missing from data model B, a user may be presented a message recommending or prompting creation of a distinct entity class on the user interface. Alternatively or additionally, a user may choose to adjust the search path in order to apply the search path to the selected data model, such as by modifying or deleting the missing element from the search path.

When an analysis is determined to be valid or applicable to a selected data model, the analysis in semantic format may be transformed to a search path and executed over the selected data model in the visualized database system. In some cases, the analysis may be created and executed over a data model that has a different context from the selected data model. The selected data model can be in any context conforming to the domain ontology. The selected data model may have a different structure (e.g., nodes and links) than the data model used for creating the search path as long as the analysis is determined to be applicable to the selected data model.

Figure 11:
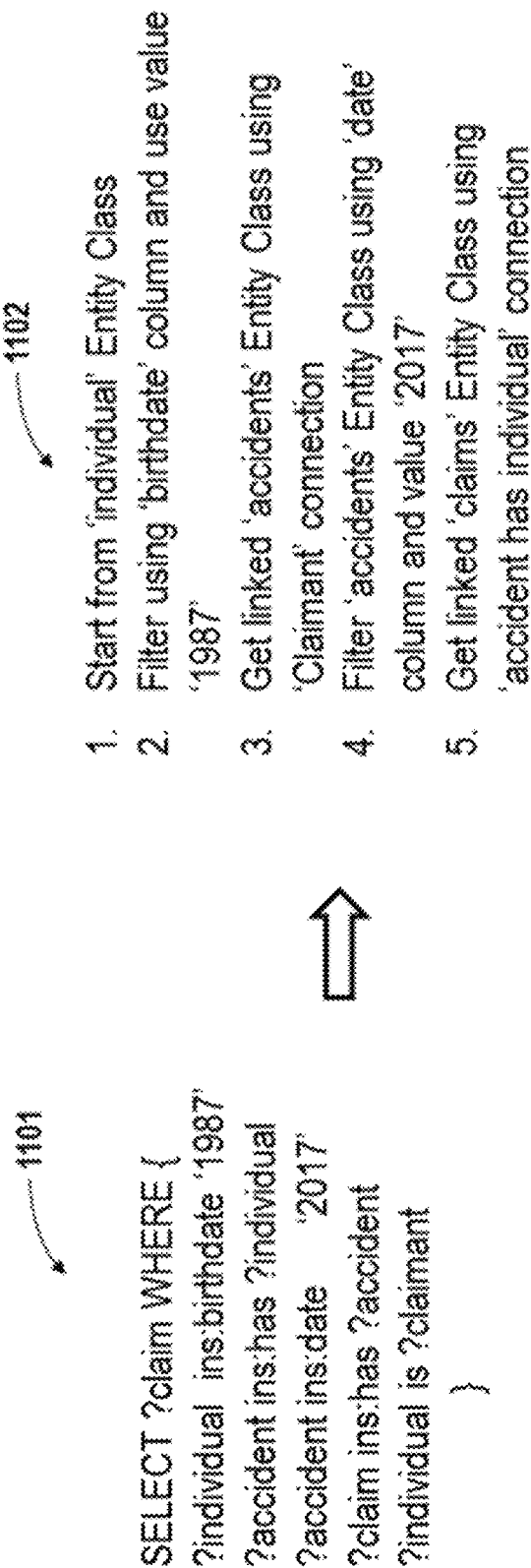
FIG. 11 shows an example of transforming an analysis in semantic format to a search path that can be executed over a data model in a visualized system.

FIG. 11 shows an example of transforming an analysis in semantic format 1101 to search path 1102 that can be executed over a data model in the visualized database system. Elements of the selected data model and/or steps of the search path in the visualized database system may be identified by extracting information from the semantic form query. For example, the entity class in a final step of the search path may be identified from the semantic form analysis. In the illustrated example, the entity class in the final step of the search path is the result set '?claim' to be returned by the 'SELECT' statement. In some cases, operations in the search path may be identified from the semantic form analysis. For example, when a condition of the OWL query includes Literal (e.g., '1987', '2017') as the object of a triple pattern, a filter operation with the Literal as the filter variable is identified. In another example, when a triple pattern comprises a relation between two entity classes, it may be transformed to a jump from entities of an entity class to entities of another entity class using selected Link Types (i.e., perform a query on a connected data set via a selected connection). Various other rules or algorithms may be defined to transform the triple patterns into components of the search path. For example, when a triple of the semantic query comprises a relation between two entity classes as a 'subclass', the corresponding component in the search path may be to merge the subclass entity class with the parent class.

In some cases, one triple pattern may correspond to one step in a search path. In some cases, two or more triples may correspond to one step in the search path. In the example shown in FIG. 11, step 3 of the search path 1102 corresponds to two triple patterns: '?accident ins:has ?individual' and '?individual is ?claimant.'

Figure 12:
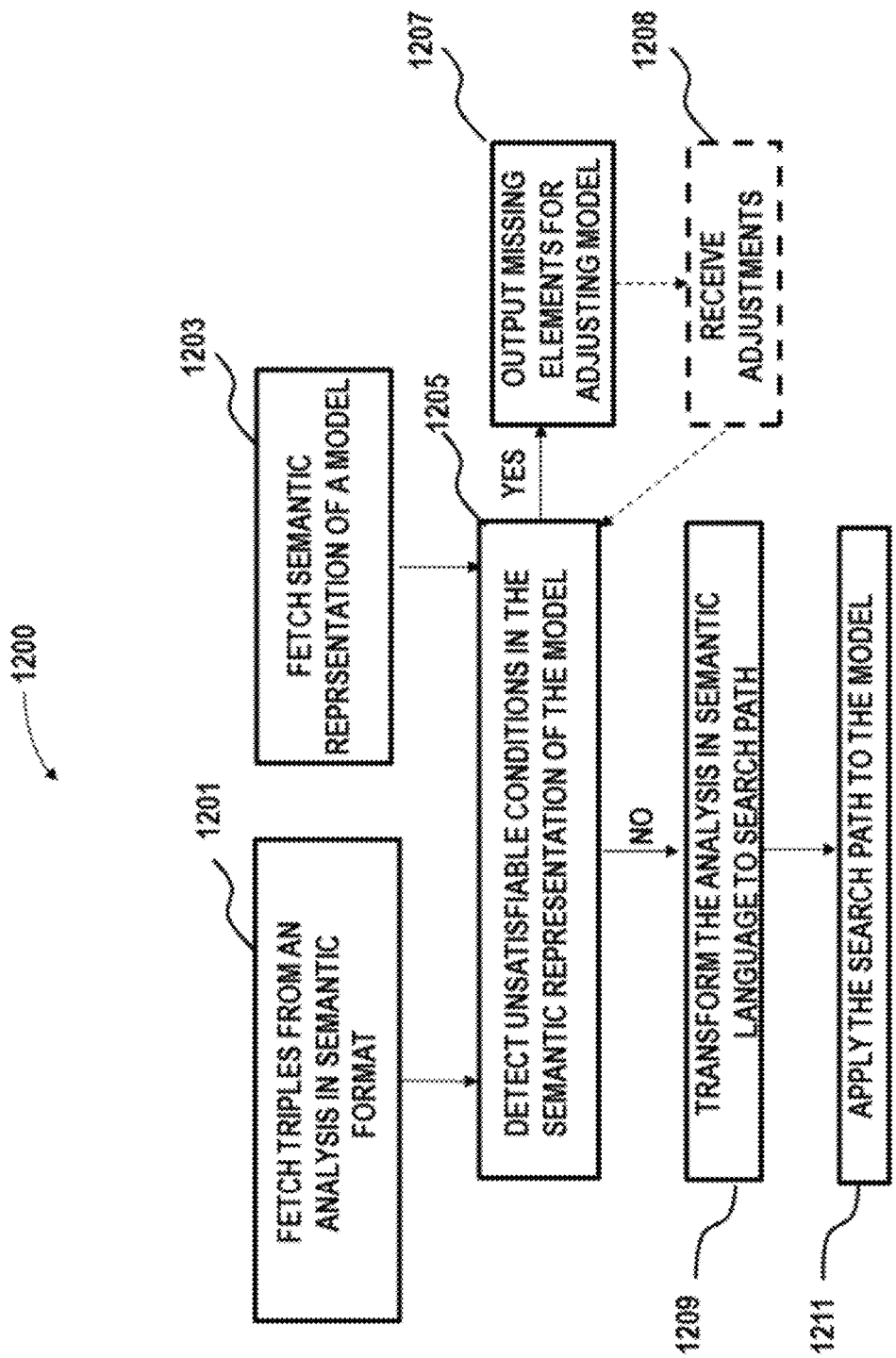
FIG. 12 shows a process for applying a semantic form search path to a selected data model.

In another example, FIG. 12 shows a process 1200 of applying a semantic form search path or analysis to a selected data model. In some embodiments, the process 1200 may be performed by the analyses engine as described above. In some embodiments, at least some operations of the process 1200 are performed by the analyses engine. The process 1200 can be performed by any other component of the visualized database system or any other component in communication with the visualized database system. The process may comprise operations for determining whether an analysis is applicable to a selected data model, then performing the analysis if the analysis is determined to be applicable, or adjusting the data model (or prompting thereof) when the analysis is determined to be inapplicable.

An analysis or search path of interest may be transformed into semantic format. A data model of interest may be transformed into a semantic format, such as to generate a semantic representation of the data model. For example, the semantic format of the analysis or search path or data model of interest may comprise one or more triple patterns. In some cases, the process 1200 may begin with fetching triples from the analysis or search path in semantic format 1201 and receiving the semantic representation of a data model 1203. The semantic form of the analysis (or search path) may be stored in a repository accessible to the analyses engine as described elsewhere herein. In some instances, the semantic representation of the data model may be stored in a repository accessible to the analyses engine.

Next, triples from the semantic form analysis may be analyzed to detect whether there is an unsatisfiable condition for the selected data model. In some cases, the unsatisfiable condition may be detected when an element in the analysis or search path is missing from the selected data model. For instance, elements such as relations, entity classes, or attributes may be extracted from the triples and matched against elements extracted from the semantic representation of the selected data model 1205. The unsatisfiable condition may be detected when one or more elements of the semantic representation of the selected data model does not match or satisfy the elements required in the semantic form analysis. In some cases, when a condition is detected to be unsatisfied, the missing elements may be outputted for further adjusting the selected data model in order to meet all the conditions 1207. Alternatively or additionally, a message indicating how to adjust (or prompting to adjust) the selected data model maybe provided, as described in the aforementioned example. In some cases, in addition to or instead of adjusting the selected data model, a user may be allowed to adjust or modify the analysis. The system may receive adjustments 1208 from the user and re-detect whether there is an unsatisfiable condition. In some cases, the operations 1205, 1207, 1208 may be repeated until all the conditions are satisfied. Alternatively, the process may be aborted when a missing element is detected.

When all the conditions or triples of the semantic form analysis are valid or satisfied, the semantic form search path may be transformed to a search path directly applicable to the selected data model 1209. This may include extracting entity classes, relations, attributes and the links from the one or more triple patterns and transforming into graph nodes, operations, links and the like in a search path. In some cases, transforming the semantic form analysis into a search path may include identifying a series of operations/steps of the search path and the order of a series of operations/steps (i.e., traversing a graph model) as described with respect to FIG. 11.

Finally, the transformed search path may be executed over the selected data model in the visualized system 1211.

Methods and systems of the present disclosure may be combined with other methods and systems, such as those described in U.S. patent application Ser. No. 14/222,795, filed Mar. 24, 2014, U.S. patent application Ser. No. 14/315,481, filed Jun. 26, 2014, U.S. patent application Ser. No. 14/469,958, filed Aug. 27, 2014, U.S. patent application Ser. No. 14/469,968, filed Aug. 27, 2014, each of which is entirely incorporated herein by reference. Such methods and systems, for example, may be used with methods and systems of the present disclosure to apply a semantic search path to various data models regardless of contexts.

Computer Systems

Figure 13:
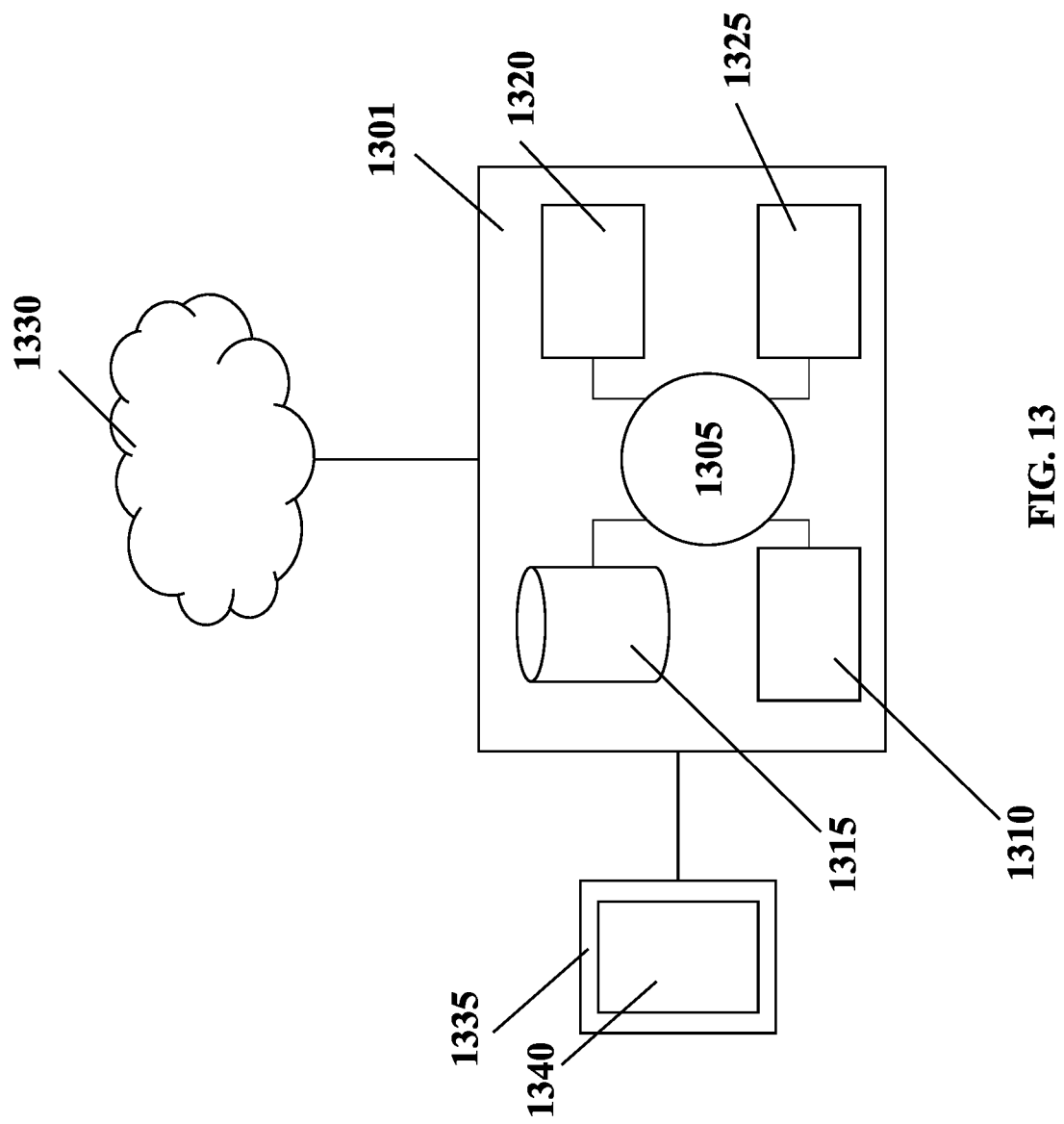
FIG. 13 shows a computer system that is programmed or otherwise configured to apply a search path to various data models regardless of contexts.

The present disclosure provides computer systems that are programmed to implement methods of the disclosure. FIG. 13 shows a computer system 1301 that is programmed or otherwise configured to apply a search path to various data models regardless of contexts. The computer system 1301 can regulate various aspects of visualization, queries and graph analysis of the present disclosure, such as, for example, creating domain ontology for an existing data model, translating a search path into semantic format, applying a semantic form search path to various data models. The computer system 1301 can be an electronic device of a user or a computer system that is remotely located with respect to the electronic device. The electronic device can be a mobile electronic device.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user (e.g., a webserver, a database server). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, visualization. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for applying an analysis to a data model, comprising:
   (a) receiving the analysis and the data model, wherein the analysis and the data model are each in semantic format;
   (b) processing the analysis and the data model to (i) identify one or more elements missing from the data model and (ii) determine that the analysis is not applicable to the data model upon identification of the one or more elements;
   (c) presenting the one or more elements to a user for adjusting the data model;
   (d) repeating (b) and (c) until the analysis is applicable to the data model; and
   (e) performing the analysis on one or more data objects of the data model.

2. The computer-implemented method of claim 1, wherein the one or more elements comprise one or more data objects that are stored in defined fixed data structures.

3. The computer-implemented method of claim 1, wherein the analysis comprises one or more operations executable on a second data model that is different from the data model.

4. The computer-implemented method of claim 1, wherein the analysis in semantic format is generated using domain ontology and semantic technology.

5. The computer-implemented method of claim 1, wherein the data model in semantic format is generated using domain ontology and semantic technology.

6. The computer-implemented method of claim 5, wherein the data model in semantic format is generated by tagging elements of the data model using terms from the domain ontology.

7. The computer-implemented method of claim 6, wherein the elements of the data model comprise links, attributes, and nodes of the data model.

8. The computer-implemented method of claim 6, wherein the elements of the data model comprise entity class, a relation between entity classes, or attributes of entity class.

9. The computer-implemented method of claim 6, wherein the terms are automatically imported and provided to a user for tagging the elements of the data model.

10. The computer-implemented method of claim 1, wherein the one or more elements are extracted from one or more triples of the analysis in the semantic format.

11. The computer-implemented method of claim 1, wherein performing the analysis on the data objects of the data model comprises: (i) transforming the analysis in semantic format into a search path executable on the data objects of the data model and (ii) executing the search path on the data objects of the data model.

12. The computer-implemented method of claim 11, wherein transforming the analysis in semantic format into the search path comprises identifying one or more operations or steps in the search path and an order thereof.

* * * * *